(12) United States Patent
Kokotov et al.

(10) Patent No.: US 7,272,459 B2
(45) Date of Patent: Sep. 18, 2007

(54) METHOD, SYSTEM AND MEDIUM FOR CONTROLLING MANUFACTURE PROCESS HAVING MULTIVARIATE INPUT PARAMETERS

(75) Inventors: Yuri Kokotov, Maaleh Adumim (IL); Efim Entin, Jersusalem (IL); Jacques Seror, Jerusalem (IL); Yossi Fisher, Jerusalem (IL); Shalomo Sarel, Maaleh Michmas (IL); Arulkumar P. Shanmugasundram, Sunnyvale, CA (US); Alexander T. Schwarm, Austin, TX (US); Young Jeen Paik, Campbell, CA (US)

(73) Assignee: Applied Materials, Inc., Santa Clara, CA (US)

( * ) Notice: Subject to any disclaimer, the term of this patent is extended or adjusted under 35 U.S.C. 154(b) by 583 days.

(21) Appl. No.: 10/712,273

(22) Filed: Nov. 14, 2003

(65) Prior Publication Data
US 2004/0225377 A1   Nov. 11, 2004

Related U.S. Application Data

(60) Provisional application No. 60/426,393, filed on Nov. 15, 2002.

(51) Int. Cl.
*G06F 19/00* (2006.01)
(52) U.S. Cl. .......................................... 700/97; 700/52
(58) Field of Classification Search .................. 700/42, 700/28, 37, 46, 52, 121, 97; 708/539, 523; 438/14, 404; 257/E21.324
See application file for complete search history.

(56) References Cited

U.S. PATENT DOCUMENTS 3,205,485 A   9/1965  Noltingk
3,229,198 A   1/1966  Libby
3,767,900 A   10/1973 Chao et al.
3,920,965 A   11/1975 Sohrwardy
4,000,458 A   12/1976 Miller et al.

(Continued)

FOREIGN PATENT DOCUMENTS

CA        2050247        8/1991

(Continued)

OTHER PUBLICATIONS

Boning, Duane et al. "Run by Run Control of Chemical- Mechanical Polishing." *IEEE Trans.* Oct. 1996. vol. 19, No. 4. pp. 307-314.

(Continued)

*Primary Examiner*—Kidest Bahta
(74) *Attorney, Agent, or Firm*—Blakely, Sokoloff, Taylor & Zafman

(57) ABSTRACT

A method, system, and medium of modeling and/or for controlling a manufacturing process is disclosed. In particular, a method according to embodiments of the present invention includes the step of identifying one or more input parameters. Each input parameter causes a change in at least two outputs. The method also includes the step of storing values of the identified inputs and corresponding empirical output values along with predicted output values. The predicted output values are calculated based on, in part, the values of the identified inputs. The method also includes the step of calculating a set of transform coefficients by minimizing a score equation that is a function of differences between one or more of the empirical output values and their corresponding predicted output values. The method further includes the steps of receiving a new set of values for the identified inputs, transforming the new set of values for the identified input using the set of coefficients, and calculating a set of predicted output values using the transformed input values.

23 Claims, 8 Drawing Sheets

U.S. PATENT DOCUMENTS

| | | | |
|---|---|---|---|
| 4,207,520 A | 6/1980 | Flora et al. |
| 4,209,744 A | 6/1980 | Gerasimov et al. |
| 4,302,721 A | 11/1981 | Urbanek et al. |
| 4,368,510 A | 1/1983 | Anderson |
| 4,609,870 A | 9/1986 | Lale et al. |
| 4,616,308 A | 10/1986 | Morshedi et al. |
| 4,663,703 A | 5/1987 | Axelby et al. |
| 4,698,766 A | 10/1987 | Entwistle et al. |
| 4,750,141 A | 6/1988 | Judell et al. |
| 4,755,753 A | 7/1988 | Chern |
| 4,757,259 A | 7/1988 | Charpentier |
| 4,796,194 A | 1/1989 | Atherton |
| 4,901,218 A | 2/1990 | Cornwell |
| 4,938,600 A | 7/1990 | Into |
| 4,957,605 A | 9/1990 | Hurwitt et al. |
| 4,967,381 A | 10/1990 | Lane et al. |
| 5,089,970 A | 2/1992 | Lee et al. |
| 5,108,570 A | 4/1992 | Wang |
| 5,208,765 A | 5/1993 | Turnbull |
| 5,220,517 A | 6/1993 | Sierk et al. |
| 5,226,118 A | 7/1993 | Baker et al. |
| 5,231,585 A | 7/1993 | Kobayashi et al. |
| 5,236,868 A | 8/1993 | Nulman |
| 5,240,552 A | 8/1993 | Yu et al. |
| 5,260,868 A | 11/1993 | Gupta et al. |
| 5,270,222 A | 12/1993 | Moslehi |
| 5,283,141 A | 2/1994 | Yoon et al. |
| 5,295,242 A | 3/1994 | Mashruwala et al. |
| 5,309,221 A | 5/1994 | Fischer et al. |
| 5,329,463 A | 7/1994 | Sierk et al. |
| 5,338,630 A | 8/1994 | Yoon et al. |
| 5,347,446 A | 9/1994 | Iino et al. |
| 5,367,624 A | 11/1994 | Cooper |
| 5,369,544 A | 11/1994 | Mastrangelo |
| 5,375,064 A | 12/1994 | Bollinger |
| 5,398,336 A | 3/1995 | Tantry et al. |
| 5,402,367 A | 3/1995 | Sullivan et al. |
| 5,408,405 A | 4/1995 | Mozumder et al. |
| 5,410,473 A | 4/1995 | Kaneko et al. |
| 5,420,796 A | 5/1995 | Weling et al. |
| 5,427,878 A | 6/1995 | Corliss |
| 5,444,837 A | 8/1995 | Bomans et al. |
| 5,469,361 A | 11/1995 | Moyne |
| 5,485,082 A | 1/1996 | Wisspeintner et al. |
| 5,490,097 A | 2/1996 | Swenson et al. |
| 5,495,417 A | 2/1996 | Fuduka et al. |
| 5,497,316 A | 3/1996 | Sierk et al. |
| 5,497,381 A | 3/1996 | O'Donoghue et al. |
| 5,503,707 A | 4/1996 | Maung et al. |
| 5,508,947 A | 4/1996 | Sierk et al. |
| 5,511,005 A | 4/1996 | Abbe et al. |
| 5,519,605 A | 5/1996 | Cawlfield |
| 5,525,808 A | 6/1996 | Irie et al. |
| 5,526,293 A | 6/1996 | Mozumder et al. |
| 5,534,289 A | 7/1996 | Bilder et al. |
| 5,541,510 A | 7/1996 | Danielson |
| 5,546,312 A | 8/1996 | Mozumder et al. |
| 5,553,195 A | 9/1996 | Meijer |
| 5,586,039 A | 12/1996 | Hirsch et al. |
| 5,599,423 A | 2/1997 | Parker et al. |
| 5,602,492 A | 2/1997 | Cresswell et al. |
| 5,603,707 A | 2/1997 | Trombetta et al. |
| 5,617,023 A | 4/1997 | Skalski |
| 5,627,083 A | 5/1997 | Tounai |
| 5,629,216 A | 5/1997 | Wijaranakula et al. |
| 5,642,296 A | 6/1997 | Saxena |
| 5,646,870 A | 7/1997 | Krivokapic et al. |
| 5,649,169 A | 7/1997 | Berezin et al. |
| 5,654,903 A | 8/1997 | Reitman et al. |
| 5,655,951 A | 8/1997 | Meikle et al. |
| 5,657,254 A | 8/1997 | Sierk et al. |
| 5,661,669 A | 8/1997 | Mozumder et al. |
| 5,663,797 A | 9/1997 | Sandhu |
| 5,664,987 A | 9/1997 | Renteln |
| 5,665,199 A | 9/1997 | Sahota et al. |
| 5,665,214 A | 9/1997 | Iturralde |
| 5,666,297 A | 9/1997 | Britt et al. |
| 5,667,424 A | 9/1997 | Pan |
| 5,674,787 A | 10/1997 | Zhao et al. |
| 5,694,325 A | 12/1997 | Fukuda et al. |
| 5,695,810 A | 12/1997 | Dubin et al. |
| 5,698,989 A | 12/1997 | Nulman |
| 5,719,495 A | 2/1998 | Moslehi |
| 5,719,796 A | 2/1998 | Chen |
| 5,735,055 A | 4/1998 | Hochbein et al. |
| 5,740,429 A | 4/1998 | Wang et al. |
| 5,751,582 A | 5/1998 | Saxena et al. |
| 5,754,297 A | 5/1998 | Nulman |
| 5,761,064 A | 6/1998 | La et al. |
| 5,761,065 A | 6/1998 | Kittler et al. |
| 5,764,543 A | 6/1998 | Kennedy |
| 5,777,901 A | 7/1998 | Berezin et al. |
| 5,787,021 A | 7/1998 | Samaha |
| 5,787,269 A | 7/1998 | Hyodo |
| 5,808,303 A | 9/1998 | Schlagheck et al. |
| 5,812,407 A | 9/1998 | Sato et al. |
| 5,823,854 A | 10/1998 | Chen |
| 5,824,599 A | 10/1998 | Schacham-Diamand et al. |
| 5,825,356 A | 10/1998 | Habib et al. |
| 5,825,913 A | 10/1998 | Rostami et al. |
| 5,828,778 A | 10/1998 | Hagi et al. |
| 5,831,851 A | 11/1998 | Eastburn et al. |
| 5,832,224 A | 11/1998 | Fehskens et al. |
| 5,838,595 A | 11/1998 | Sullivan et al. |
| 5,838,951 A | 11/1998 | Song |
| 5,844,554 A | 12/1998 | Geller et al. |
| 5,857,258 A | 1/1999 | Penzes et al. |
| 5,859,777 A | 1/1999 | Yokoyama et al. |
| 5,859,964 A | 1/1999 | Wang et al. |
| 5,859,975 A | 1/1999 | Brewer et al. |
| 5,862,054 A | 1/1999 | Li |
| 5,863,807 A | 1/1999 | Jang et al. |
| 5,867,389 A | 2/1999 | Hamada et al. |
| 5,870,306 A | 2/1999 | Harada |
| 5,871,805 A | 2/1999 | Lemelson |
| 5,883,437 A | 3/1999 | Maruyama et al. |
| 5,889,991 A | 3/1999 | Consolatti et al. |
| 5,901,313 A | 5/1999 | Wolfe et al. |
| 5,903,455 A | 5/1999 | Sharpe, Jr. et al. |
| 5,910,011 A | 6/1999 | Cruse |
| 5,910,846 A | 6/1999 | Sandhu |
| 5,912,678 A | 6/1999 | Saxena et al. |
| 5,916,016 A | 6/1999 | Bothra |
| 5,923,553 A | 7/1999 | Yi |
| 5,926,690 A | 7/1999 | Toprac et al. |
| 5,930,138 A | 7/1999 | Lin et al. |
| 5,940,300 A | 8/1999 | Ozaki |
| 5,943,237 A | 8/1999 | Van Boxem |
| 5,943,550 A | 8/1999 | Fulford, Jr. et al. |
| 5,960,185 A | 9/1999 | Nguyen |
| 5,960,214 A | 9/1999 | Sharpe, Jr. et al. |
| 5,961,369 A | 10/1999 | Bartels et al. |
| 5,963,881 A | 10/1999 | Kahn et al. |
| 5,975,994 A | 11/1999 | Sandhu et al. |
| 5,978,751 A | 11/1999 | Pence et al. |
| 5,982,920 A | 11/1999 | Tobin, Jr. et al. |
| 6,002,989 A | 12/1999 | Shiba et al. |
| 6,012,048 A | 1/2000 | Gustin et al. |
| 6,017,771 A | 1/2000 | Yang et al. |
| 6,036,349 A | 3/2000 | Gombar |
| 6,037,664 A | 3/2000 | Zhao et al. |
| 6,041,263 A | 3/2000 | Boston et al. |
| 6,041,270 A | 3/2000 | Steffan et al. |
| 6,054,379 A | 4/2000 | Yau et al. |

| Patent | Date | Inventor |
|---|---|---|
| 6,059,636 A | 5/2000 | Inaba et al. |
| 6,064,759 A | 5/2000 | Buckley et al. |
| 6,072,313 A | 6/2000 | Li et al. |
| 6,074,443 A | 6/2000 | Venkatesh et al. |
| 6,077,412 A | 6/2000 | Ting et al. |
| 6,078,845 A | 6/2000 | Friedman |
| 6,094,688 A | 7/2000 | Mellen-Garnett et al. |
| 6,096,649 A | 8/2000 | Jang |
| 6,097,887 A | 8/2000 | Hardikar et al. |
| 6,100,195 A | 8/2000 | Chan et al. |
| 6,108,092 A | 8/2000 | Sandhu |
| 6,111,634 A | 8/2000 | Pecen et al. |
| 6,112,130 A | 8/2000 | Fukuda et al. |
| 6,113,462 A | 9/2000 | Yang |
| 6,114,238 A | 9/2000 | Liao |
| 6,127,263 A | 10/2000 | Parikh |
| 6,128,016 A | 10/2000 | Coelho et al. |
| 6,136,163 A | 10/2000 | Cheung et al. |
| 6,141,660 A | 10/2000 | Bach et al. |
| 6,143,646 A | 11/2000 | Wetzel |
| 6,148,099 A | 11/2000 | Lee et al. |
| 6,148,239 A | 11/2000 | Funk et al. |
| 6,148,246 A | 11/2000 | Kawazome |
| 6,150,270 A | 11/2000 | Matsuda et al. |
| 6,157,864 A | 12/2000 | Schwenke et al. |
| 6,159,075 A | 12/2000 | Zhang |
| 6,159,644 A | 12/2000 | Satoh et al. |
| 6,161,054 A | 12/2000 | Rosenthal et al. |
| 6,169,931 B1 | 1/2001 | Runnels |
| 6,172,756 B1 | 1/2001 | Chalmers et al. |
| 6,173,240 B1 | 1/2001 | Sepulveda et al. |
| 6,175,777 B1 | 1/2001 | Kim |
| 6,178,390 B1 | 1/2001 | Jun |
| 6,181,013 B1 | 1/2001 | Liu et al. |
| 6,183,345 B1 | 2/2001 | Kamono et al. |
| 6,185,324 B1 | 2/2001 | Ishihara et al. |
| 6,191,864 B1 | 2/2001 | Sandhu |
| 6,192,291 B1 | 2/2001 | Kwon |
| 6,197,604 B1 | 3/2001 | Miller et al. |
| 6,204,165 B1 | 3/2001 | Ghoshal |
| 6,210,983 B1 | 4/2001 | Atchison et al. |
| 6,211,094 B1 | 4/2001 | Jun et al. |
| 6,212,961 B1 | 4/2001 | Dvir |
| 6,214,734 B1 | 4/2001 | Bothra et al. |
| 6,217,412 B1 | 4/2001 | Campbell et al. |
| 6,219,711 B1 | 4/2001 | Chari |
| 6,222,936 B1 | 4/2001 | Phan et al. |
| 6,226,563 B1 | 5/2001 | Lim |
| 6,226,792 B1 | 5/2001 | Goiffon et al. |
| 6,228,280 B1 | 5/2001 | Li et al. |
| 6,230,069 B1 | 5/2001 | Campbell et al. |
| 6,236,903 B1 | 5/2001 | Kim et al. |
| 6,237,050 B1 | 5/2001 | Kim et al. |
| 6,240,330 B1 | 5/2001 | Kurtzberg et al. |
| 6,240,331 B1 | 5/2001 | Yun |
| 6,245,581 B1 | 6/2001 | Bonser et al. |
| 6,246,972 B1 | 6/2001 | Klimasauskas |
| 6,248,602 B1 | 6/2001 | Bode et al. |
| 6,249,712 B1 | 6/2001 | Boiquaye |
| 6,252,412 B1 | 6/2001 | Talbot et al. |
| 6,253,366 B1 | 6/2001 | Mutschler, III |
| 6,259,160 B1 | 7/2001 | Lopatin et al. |
| 6,263,255 B1 | 7/2001 | Tan et al. |
| 6,268,270 B1 | 7/2001 | Scheid et al. |
| 6,271,670 B1 | 8/2001 | Caffey |
| 6,276,989 B1 | 8/2001 | Campbell et al. |
| 6,277,014 B1 | 8/2001 | Chen et al. |
| 6,278,899 B1 | 8/2001 | Piche et al. |
| 6,280,289 B1 | 8/2001 | Wiswesser et al. |
| 6,281,127 B1 | 8/2001 | Shue |
| 6,284,622 B1 | 9/2001 | Campbell et al. |
| 6,287,879 B1 | 9/2001 | Gonzales et al. |
| 6,290,572 B1 | 9/2001 | Hofmann |
| 6,291,367 B1 | 9/2001 | Kelkar |
| 6,292,708 B1 | 9/2001 | Allen et al. |
| 6,298,274 B1 | 10/2001 | Inoue |
| 6,298,470 B1 | 10/2001 | Breiner et al. |
| 6,303,395 B1 | 10/2001 | Nulman |
| 6,304,999 B1 | 10/2001 | Toprac et al. |
| 6,307,628 B1 | 10/2001 | Lu et al. |
| 6,314,379 B1 | 11/2001 | Hu et al. |
| 6,317,643 B1 | 11/2001 | Dmochowski |
| 6,320,655 B1 | 11/2001 | Matsushita et al. |
| 6,324,481 B1 | 11/2001 | Atchison et al. |
| 6,334,807 B1 | 1/2002 | Lebel et al. |
| 6,336,841 B1 | 1/2002 | Chang |
| 6,339,727 B1 | 1/2002 | Ladd |
| 6,340,602 B1 | 1/2002 | Johnson et al. |
| 6,345,288 B1 | 2/2002 | Reed et al. |
| 6,345,315 B1 | 2/2002 | Mishra |
| 6,346,426 B1 | 2/2002 | Toprac et al. |
| 6,355,559 B1 | 3/2002 | Havemann et al. |
| 6,360,133 B1 | 3/2002 | Campbell et al. |
| 6,360,184 B1 | 3/2002 | Jacquez |
| 6,363,294 B1 | 3/2002 | Coronel et al. |
| 6,366,934 B1 | 4/2002 | Cheng et al. |
| 6,368,879 B1 | 4/2002 | Toprac |
| 6,368,883 B1 | 4/2002 | Bode et al. |
| 6,368,884 B1 | 4/2002 | Goodwin et al. |
| 6,373,033 B1 | 4/2002 | de Waard et al. |
| 6,379,980 B1 | 4/2002 | Toprac |
| 6,381,564 B1 | 4/2002 | David et al. |
| 6,388,253 B1 | 5/2002 | Su |
| 6,389,491 B1 | 5/2002 | Jacobson et al. |
| 6,391,780 B1 | 5/2002 | Shih et al. |
| 6,395,152 B1 | 5/2002 | Wang |
| 6,397,114 B1 | 5/2002 | Eryurek et al. |
| 6,400,162 B1 | 6/2002 | Mallory et al. |
| 6,405,096 B1 | 6/2002 | Toprac et al. |
| 6,405,144 B1 | 6/2002 | Toprac et al. |
| 6,417,014 B1 | 7/2002 | Lam et al. |
| 6,427,093 B1 | 7/2002 | Toprac |
| 6,432,728 B1 | 8/2002 | Tai et al. |
| 6,435,952 B1 | 8/2002 | Boyd et al. |
| 6,438,438 B1 | 8/2002 | Takagi et al. |
| 6,440,295 B1 | 8/2002 | Wang |
| 6,442,496 B1 | 8/2002 | Pasadyn et al. |
| 6,449,524 B1 | 9/2002 | Miller et al. |
| 6,455,415 B1 | 9/2002 | Lopatin et al. |
| 6,455,937 B1 | 9/2002 | Cunningham |
| 6,465,263 B1 | 10/2002 | Coss, Jr. et al. |
| 6,470,230 B1 | 10/2002 | Toprac et al. |
| 6,479,902 B1 | 11/2002 | Lopatin et al. |
| 6,479,990 B1 | 11/2002 | Mednikov et al. |
| 6,482,660 B2 | 11/2002 | Conchieri et al. |
| 6,484,064 B1 | 11/2002 | Campbell |
| 6,486,492 B1 | 11/2002 | Su |
| 6,492,281 B1 | 12/2002 | Song et al. |
| 6,495,452 B1 | 12/2002 | Shih |
| 6,503,839 B2 | 1/2003 | Gonzales et al. |
| 6,515,368 B1 | 2/2003 | Lopatin et al. |
| 6,517,413 B1 | 2/2003 | Hu et al. |
| 6,517,414 B1 | 2/2003 | Tobin et al. |
| 6,528,409 B1 | 3/2003 | Lopatin et al. |
| 6,529,789 B1 | 3/2003 | Campbell et al. |
| 6,532,555 B1 | 3/2003 | Miller et al. |
| 6,535,783 B1 | 3/2003 | Miller et al. |
| 6,537,912 B1 | 3/2003 | Agarwal |
| 6,540,591 B1 | 4/2003 | Pasadyn et al. |
| 6,541,401 B1 | 4/2003 | Herner et al. |
| 6,546,508 B1 | 4/2003 | Sonderman et al. |
| 6,556,881 B1 | 4/2003 | Miller |
| 6,560,504 B1 | 5/2003 | Goodwin et al. |
| 6,563,308 B2 | 5/2003 | Nagano et al. |
| 6,567,717 B2 | 5/2003 | Krivokapic et al. |
| 6,580,958 B1 | 6/2003 | Takano |

| | | |
|---|---|---|
| 6,587,744 B1 | 7/2003 | Stoddard et al. |
| 6,590,179 B2 | 7/2003 | Tanaka et al. |
| 6,604,012 B1 | 8/2003 | Cho et al. |
| 6,605,549 B2 | 8/2003 | Leu et al. |
| 6,607,976 B2 | 8/2003 | Chen et al. |
| 6,609,946 B1 | 8/2003 | Tran |
| 6,616,513 B1 | 9/2003 | Osterheld |
| 6,618,692 B2 | 9/2003 | Takahashi et al. |
| 6,624,075 B1 | 9/2003 | Lopatin et al. |
| 6,625,497 B2 | 9/2003 | Fairbairn et al. |
| 6,630,741 B1 | 10/2003 | Lopatin et al. |
| 6,640,151 B1 | 10/2003 | Somekh et al. |
| 6,652,355 B2 | 11/2003 | Wiswesser et al. |
| 6,660,633 B1 | 12/2003 | Lopatin et al. |
| 6,678,570 B1 | 1/2004 | Pasadyn et al. |
| 6,708,074 B1 | 3/2004 | Chi et al. |
| 6,708,075 B2 | 3/2004 | Sonderman et al. |
| 6,725,402 B1 | 4/2004 | Coss, Jr. et al. |
| 6,728,587 B2 | 4/2004 | Goldman et al. |
| 6,735,492 B2 | 5/2004 | Conrad et al. |
| 6,751,518 B1 | 6/2004 | Sonderman et al. |
| 6,754,542 B1 * | 6/2004 | Tanaka .................. 700/42 |
| 6,774,998 B1 | 8/2004 | Wright et al. |
| 2001/0001755 A1 | 5/2001 | Sandhu et al. |
| 2001/0003084 A1 | 6/2001 | Finarov |
| 2001/0006873 A1 | 7/2001 | Moore |
| 2001/0030366 A1 | 10/2001 | Nakano et al. |
| 2001/0039462 A1 | 11/2001 | Mendez et al. |
| 2001/0040997 A1 | 11/2001 | Tsap et al. |
| 2001/0042690 A1 | 11/2001 | Talieh |
| 2001/0044667 A1 | 11/2001 | Nakano et al. |
| 2002/0032499 A1 | 3/2002 | Wilson et al. |
| 2002/0058460 A1 | 5/2002 | Lee et al. |
| 2002/0070126 A1 | 6/2002 | Sato et al. |
| 2002/0077031 A1 | 6/2002 | Johannson et al. |
| 2002/0081951 A1 | 6/2002 | Boyd et al. |
| 2002/0089676 A1 | 7/2002 | Pecen et al. |
| 2002/0102853 A1 | 8/2002 | Li et al. |
| 2002/0107599 A1 | 8/2002 | Patel et al. |
| 2002/0107604 A1 | 8/2002 | Riley et al. |
| 2002/0113039 A1 | 8/2002 | Mok et al. |
| 2002/0127950 A1 | 9/2002 | Hirose et al. |
| 2002/0128805 A1 | 9/2002 | Goldman et al. |
| 2002/0149359 A1 | 10/2002 | Crouzen et al. |
| 2002/0165636 A1 | 11/2002 | Hasan |
| 2002/0183986 A1 | 12/2002 | Stewart et al. |
| 2002/0185658 A1 | 12/2002 | Inoue et al. |
| 2002/0193899 A1 | 12/2002 | Shanmugasundram et al. |
| 2002/0193902 A1 | 12/2002 | Shanmugasundram et al. |
| 2002/0197745 A1 | 12/2002 | Shanmugasundram et al. |
| 2002/0197934 A1 | 12/2002 | Paik |
| 2002/0199082 A1 | 12/2002 | Shanmugasundram et al. |
| 2003/0017256 A1 | 1/2003 | Shimane |
| 2003/0020909 A1 | 1/2003 | Adams et al. |
| 2003/0020928 A1 | 1/2003 | Ritzdorf et al. |
| 2003/0154062 A1 | 8/2003 | Daft et al. |

FOREIGN PATENT DOCUMENTS

| | | |
|---|---|---|
| CA | 2165847 | 8/1991 |
| CA | 2194855 | 8/1991 |
| EP | 0 397 924 A1 | 11/1990 |
| EP | 0 621 522 A2 | 10/1994 |
| EP | 0 747 795 A2 | 12/1996 |
| EP | 0 869 652 A2 | 10/1998 |
| EP | 0 877 308 A2 | 11/1998 |
| EP | 0 881 040 A2 | 12/1998 |
| EP | 0 895 145 A1 | 2/1999 |
| EP | 0 910 123 A1 | 4/1999 |
| EP | 0 932 194 A1 | 7/1999 |
| EP | 0 932 195 A1 | 7/1999 |
| EP | 1 066 925 A2 | 1/2001 |
| EP | 1 067 757 A1 | 1/2001 |
| EP | 1 071 128 A2 | 1/2001 |
| EP | 1 083 470 A2 | 3/2001 |
| EP | 1 092 505 A2 | 4/2001 |
| EP | 1 072 967 A3 | 11/2001 |
| EP | 1 182 526 A2 | 2/2002 |
| GB | 2 347 885 A | 9/2000 |
| GB | 2 363 477 A | 12/2001 |
| GB | 2 365 215 A | 2/2002 |
| JP | 61-66104 | 4/1986 |
| JP | 61-171147 | 8/1986 |
| JP | 01-283934 | 11/1989 |
| JP | 3-202710 | 9/1991 |
| JP | 05-151231 | 6/1993 |
| JP | 05-216896 | 8/1993 |
| JP | 05-266029 | 10/1993 |
| JP | 06-110894 | 4/1994 |
| JP | 06-176994 | 6/1994 |
| JP | 06-184434 | 7/1994 |
| JP | 06-252236 | 9/1994 |
| JP | 06-260380 | 9/1994 |
| JP | 8-23166 | 1/1996 |
| JP | 08-50161 | 2/1996 |
| JP | 08-149583 | 6/1996 |
| JP | 08-304023 | 11/1996 |
| JP | 09-34535 | 2/1997 |
| JP | 9-246547 | 9/1997 |
| JP | 10-34522 | 2/1998 |
| JP | 10-173029 | 6/1998 |
| JP | 11-67853 | 3/1999 |
| JP | 11-126816 | 5/1999 |
| JP | 11-135601 | 5/1999 |
| JP | 2000-183001 | 4/2000 |
| JP | 2001-76982 | 3/2001 |
| JP | 2001-284299 | 10/2001 |
| JP | 2001-305108 | 10/2001 |
| JP | 2002-9030 | 1/2002 |
| JP | 2002-343754 | 11/2002 |
| TW | 434103 | 5/2001 |
| TW | 436383 B | 5/2001 |
| TW | 455938 B | 9/2001 |
| TW | 455976 | 9/2001 |
| WO | WO95/34866 | 12/1995 |
| WO | WO98/05066 | 2/1998 |
| WO | WO98/45090 | 10/1998 |
| WO | WO99/09371 | 2/1999 |
| WO | WO99/25520 | 5/1999 |
| WO | WO 99/25520 | 5/1999 |
| WO | WO99/59200 | 11/1999 |
| WO | WO 00/00874 | 1/2000 |
| WO | WO 00/05759 | 2/2000 |
| WO | WO 00/35063 | 6/2000 |
| WO | WO 00/54325 | 9/2000 |
| WO | WO 00/79355 A1 | 12/2000 |
| WO | WO 01/01205 A2 | 1/2001 |
| WO | WO 01/11679 A1 | 2/2001 |
| WO | WO 01/15865 A1 | 3/2001 |
| WO | WO 01/18623 A1 | 3/2001 |
| WO | WO 01/25865 A1 | 4/2001 |
| WO | WO 01/33277 A1 | 5/2001 |
| WO | WO 01/33501 A1 | 5/2001 |
| WO | WO 01/52055 A3 | 7/2001 |
| WO | WO 01/52319 A1 | 7/2001 |
| WO | WO 01/57823 A2 | 8/2001 |
| WO | WO 01/80306 A2 | 10/2001 |
| WO | WO 02/17150 A1 | 2/2002 |
| WO | WO 02/31613 A2 | 4/2002 |
| WO | WO 02/31613 A3 | 4/2002 |
| WO | WO 02/33737 A2 | 4/2002 |

WO  WO 02/074491 A1  9/2002

OTHER PUBLICATIONS

Moyne, James et al. "A Run-to-Run Control Framework for VLSI Manufacturing." *Microelectronic Processing '93 Conference Proceedings.* Sep. 1993.

Telfeyan, Roland et al. "Demonstration of a Process-Independent Run-to-Run Controller." *187th Meeting of the Electrochemical Society.* May 1995.

Moyne, James et al. "A Process-Independent Run-to-Run Controller and Its Application to Chemical-Mechanical Planarization." *SEMI/IEEE Adv. Semiconductor Manufacturing Conference.* Aug. 15, 1995.

Moyne, James et al. "Adaptive Extensions to be a Multi-Branch Run-to-Run Controller for Plasma Etching." *Journal of Vacuum Science and Technology.* 1995.

Sachs, Emanuel et al. "Process Control System for VLSI Fabrication."

Chaudhry, Nauman et al. "Active Controller: Utilizing Active Databases for Implementing Multi-Step Control of Semiconductor Manufacturing." *University of Michigan.* pp. 1-24.

Chaudhry, Nauman et al. "Designing Databases with Fuzzy Data and Rules for Application to Discrete Control." *University of Michigan.* pp. 1-21.

Chaudhry, Nauman A. et al. "A Design Methodology for Databases with Uncertain Data." *University of Michigan.* pp. 1-14.

Khan, Kareemullah et al. "Run-to-Run Control of ITO Deposition Process." *University of Michigan.* pp. 1-6.

Moyne, James et al. "Yield Improvement @ Contact Through Run-to-Run Control."

Kim, Jiyoun et al. "Gradient and Radial Uniformity Control of a CMP Process Utilizing a Pre- and Post- Measurement Strategy." *University of Michigan.*

Nov. 19, 2004. International Search Report for PCT Application No. PCT/US03/36501.

IslamRaja, M. M., C. Chang, J. P. McVittie, M. A. Cappelli, and K. C. Saraswat. May/Jun. 1993. "Two Precursor Model for Low-Pressure Chemical Vapor Deposition of Silicon Dioxide from Tetraethylorthosilicate." *J. Vac. Sci. Technol.* B, vol. 11, No. 3, pp. 720-726.

Kim, Eui Jung and William N. Gill. Jul. 1994. "Analytical Model for Chemical Vapor Deposition of $SiO_2$ Films Using Tetraethoxysliane and Ozone"(Abstract). *Journal of Crystal Growth*, vol. 140, Issues 3-4, pp. 315-326.

Guo, R.S, A. Chen, C.L. Tseng, I.K. Fong, A. Yang, C.L. Lee, C.H. Wu, S. Lin, S.J. Huang, Y.C. Lee, S.G. Chang, and M.Y. Lee. Jun. 16-17, 1998. "A Real-Time Equipment Monitoring and Fault Detection System." *Semiconductor Manufacturing Technology Workshop*, pp. 111-121.

Lantz, Mikkel. 1999. "Equipment and APC Integration at AMD with Workstream." *IEEE*, pp. 325-327.

Aug. 9, 2004. Written Opinion for PCT Serial No. PCT/US02/190623.

Aug. 18, 2004, International Preliminary Examination Report for PCT Serial. No. PCT/US02/19116.

Sep. 9, 2004. Written Opinion for PCT Serial. No. PCT/US02/21942.

Sep. 16, 2004. International Preliminary Examination Report for PCT Serial No. PCT/US02/24859.

Sun, S.C. 1998. "CVD and PVD Transition Metal Nitrides as Diffusion Barriers for Cu Metallization." *IEEE.* pp. 243-246.

Tagami, M., A. Furuya, T. Onodera, and Y. Hayashi. 1999. "Layered Ta-nitrides (LTN) Barrier Film by Power Swing Sputtering (PSS) Technique for MOCVD-Cu Damascene Interconnects." *IEEE.* pp. 635-638.

Yamagishi, H., Z. Tokei, G.P. Beyer, R. Donaton, H. Bender, T. Nogami, and K. Maex. 2000. "TEM/SEM Investigation and Electrical Evaluation of a Bottomless I-PVD TA(N) Barrier in Dual Damascene" (Abstract). *Advanced Metallization Conference 2000.* San Diego, CA.

Eisenbraun, Eric, Oscar van der Straten, Yu Zhu, Katharine Dovidenko, and Alain Kaloyeros. 2001. "Atomic Layer Deposition (ALD) of Tantalum-Based Materials for Zero Thickness Copper Barrier Applications" (Abstract). *IEEE.* pp. 207-209.

Smith, S.R., K.E. Elers, T. Jacobs, V. Blaschke, and K. Pfeifer. 2001. "Physical and Electrical Characterization of ALD Tin Used as a Copper Diffusion Barrier in 0.25 mum, Dual Damascene Backend Structures" (Abstract). *Advanced Metallization Conference 2001.* Montreal, Quebec.

Kim, Y.T. and H. Sim. 2002. "Characteristics of Pulse Plasma Enhanced Atomic Layer Deposition of Tungsten Nitride Diffusion Barrier for Copper Interconnect" (Abstract). *IEIC Technical Report.* vol. 102, No. 178, pp. 115-118.

Elers, Kai-Erik, Ville Saanila, Pekka J. Soininen, Wei-Min Li, Juhana T. Kostamo, Suvi Haukka, Jyrki Juhanoja, and Wim F.A. Besling. 2002. "Diffusion Barrier Deposition on a Copper Surface by Atomic Layer Deposition" (Abstract). *Advanced Materials.* vol. 14, No. 13-14, pp. 149-153.

Peng, C.H., C.H. Hsieh, C.L. Huang, J.C. Lin, M.H. Tsai, M.W. Lin, C.L. Chang, Winston S. Shue, and M.S. Liang. 2002. "A 90nm Generation Copper Dual DAmascene Technology with ALD TaN Barrier." *IEEE.* pp. 603-606.

Van der Straten, O., Y . Zhu, E. Eisenbraun, and A. Kaloyeros. 2002. "Thermal and Electrical Barrier Performance Testing of Ultrathin Atomic Layer Deposition Tantalum-Based Materials for Nanoscale Copper Metallization." *IEEE.* pp. 188-190.

Wu, Z.C., Y.C. Lu, C.C. Chiang, M.C. Chen, B.T. Chen, G.J. Wang, Y.T. Chen, J.L. Huang, S.M. Jang, and M.S. Liang. 2002. "Advanced Metal Barrier Free Cu Damascene Interconnects with PECVD Silicon Carbide Barriers for 90/65-nm BEOL Technology." *IEEE.* pp. 595-598.

Jul. 25, 2003. International Search Report for PCT/US02/24858.

Mar. 30, 2004. Written Opinion for PCT/US02/19062.

Apr. 9, 2004. Written Opinion for PCT/US02/19116.

Apr. 22, 2004. Office Action for U.S. Appl. No. 09/998,372, filed Nov. 30, 2001.

Apr. 28, 2004. Written Opinion for PCT/US02/19117.

Apr. 29, 2004. Written Opinion for PCT/US02/19061.

May 5, 2004, International Preliminary Examination Report for PCT/US01/27406.

Feb. 1984. "Substrate Screening Process." *IBM Technical Disclosure Bulletin*, pp. 4824-4825.

Miller, G. L., D. A. H. Robinson, and J. D. Wiley. Jul. 1976. "Contactless measurement of semiconductor conductivity by radio frequency-free-carrier power absoption." *Rev. Sci. Instrum.*, vol. 47, No. 7. pp. 799-805.

Ostanin, Yu. Ya. Oct. 1981. "Optimization of Thickness Inspection of Electrically Conductive Single-Layer Coatings with Laid-on Eddy-Current Transducers (Abstract)." *Defektoskopiya*, vol. 17, No. 10, pp. 45-52. Moscow, USSR.

Feb. 1984. "Method and Apparatus of in Situ Measurement and Overlay Error Analysis for Correcting Step and Repeat Lithographic Cameras." *IBM Technical Disclosure Bulletin*, pp. 4855-4859.

Oct. 1984. "Method to Characterize the Stability of a Step and Repeat Lithographic System." *IBM Technical Disclosure Bulletin*, pp. 2857-2860.

Levine, Martin D. 1985. *Vision in Man and Machine.* New York: McGraw-Hill, Inc. pp. ix-xii, 1-58.

Herrmann, D. 1988. "Temperature Errors and Ways of Elimination for Contactless Measurement of Shaft Vibrations (Abstract)." *Technisches Messen™*, vol. 55, No. 1, pp. 27-30. West Germany.

Lin, Kuang-Kuo and Costas J. Spanos. Nov. 1990. "Statistical Equipment Modeling for VLSI Manufacturing: An Application for LPCVD." *IEEE Transactions on Semiconductor Manufacturing*, v. 3, n. 4, pp. 216-229.

Runyan, W. R., amd K. E. Bean. 1990. "Semiconductor Integrated Circuit Processing Technology." p. 48. Reading, Massachusetts: Addison-Wesley Publishing Company.

Chang, Norman H. and Costas J. Spanos. Feb. 1991. "Continuous Equipment Diagnosis Using Evidence Integration: An LPCVD Application." *IEEE Transactions on Semiconductor Manufacturing*, v. 4, n. 1, pp. 43-51.

Larrabee, G. B. May 1991. "The Intelligent Microelectronics Factory of the Future (Abstract)." *IEEE/SEMI International Semiconductor Manufacturing Science Symposium*, pp. 30-34. Burlingame, CA.

Burke, Peter A. Jun. 1991. "Semi-Empirical Modelling of SiO2 Chemical-Mechanical Polishing Planarization." *VMIC Conference, 1991 IEEE*, pp. 379-384. IEEE.

Zorich, Robert, 1991, *Handbook of Quality Integrated Circuit Manufacturing*. pp. 464-498 San Diego, California: Academic Press, Inc.

Rampalli, Prasad, Arakere Ramesh, and Nimish Shah. 1991. *CEPT—A Computer-Aided Manufacturing Application for Managing Equipment Reliability and Availability in the Semiconductor Industry* New York, New York: IEEE.

May 1992. "Laser Ablation Endpoint Detector." *IBM Technical DIsclosure Bulletin*, pp. 333-334.

Spanos, Costas J., Hai-Fang Guo, Alan Miller, and Joanne Levine-Parrill. Nov. 1992. "Real-Time Statistical Process Control Using Tool Data." *IEEE Transactions on Semiconductor Manufacturing*, v. 5, n. 4, pp. 308-318.

Feb. 1993. "Electroless Plating Scheme to Hermetically Seal Copper Features." *IBM Technical Disclosure Bulletin*, pp. 405-406.

Scarr, J. M. and J. K. Zelisse. Apr. 1993. "New Topology for Thickness Monitoring Eddy Current Sensors (Abstract)." *Proceedings of the 36th Annual Technical Conference*, Dallas Texas.

Hu, Albert, Kevin Nguyen, Steve Wong, Xiuhua Zhang, Emanuel Sachs, and Peter Renteln. 1993. "Concurrent Deployment of Run by Run Controller Using SCC Framework." IEEE/SEMI International Semiconductor Manufacturing Science Symposium. pp. 126-132.

Matsuyama, Akira and Jessi Niou. 1993. "A State-of-the Art Automation System of an ASIC Wafer Fab in Japan." *IEEE/SEMI International Semiconductor Manufacturing Science Syposium*, pp. 42-47.

Yeh, C. Eugene, John C. Cheng, and Kwan Wong. 1993. "Implementation Challenges of a Feedback Control System for Wafer Fabrication." *IEEE/CHMT International Electronics Manufacturing Technology Symposium*, pp. 438-442.

Kurtzberg, Jerome M. and Menachem Levanoni. Jan. 1994. "ABC: A Better Control for Manufacturing." *IBM Journal of Research and Development*, v. 38, n. 1, pp. 11-30.

Mozumder, Purnendu K. and Gabriel G. Barna. Feb. 1994. "Statistical Feedback Control of a Plasma Etch Process." *IEEE Transactions on Semiconductor Manufacturing*, v. 7, n. 1, pp. 1-11.

Muller-Heinzerling, Thomas, Ulrich Neu, Hans Georg Nurnberg, and Wolfgang May. Mar. 1994. "Recipe-Controlled Operation of Batch Processes with Batch X." *ATP Automatisierungstechnische Praxis*, vol. 36, No. 3, pp. 43-51.

Stoddard, K., P. Crouch, M. Kozicki, and K. Tsakalis. Jun. -Jul. 1994. "Application of Feedforward and Adaptive Feedback Control to Semiconductor Device Manufacturing (Abstract)." *Proceeding of the 1994 American Control Conference—ACC'94*, vol. 1, pp. 892-896. Baltimore, Maryland.

Rocha, Joao and Carlos Ramos. Sep. 12, 1994. "Task Planning for Flexible and Agile Manufacturing Systems." *Intelligent Robots and Systems '94. Advanced Robotic Systems and the Real World, IROS '94. Proceedings of the IEEE/RSJ/GI International Conference on Munich, Germany* Sep. 12-16 1994. New York, New York: IEEE., pp. 105-112.

Schaper, C. D., M. M. Moslehi, K. C. Saraswat, and T. Kailath. Nov. 1994. "Modeling, Identification, and Control of Rapid Thermal Processing Systems (Abstract)." *Journal of the Electrochemical Society*, vol. 141, No. 11, pp. 3200-3209.

Tao, K. M., R. L. Kosut, M. Ekblad, and G. Aral. Dec. 1994. "Feedforward Learning Applied to RTP of Semiconductor Wafers (Abstract)." *Proceedings of the 33rd IEEE Conference on Decision and Control*, vol. 1, pp. 67-72. Lake Buena Vista, Florida.

Hu, Albert, He Du, Steve Wong, Peter Renteln, and Emmanuel Sachs. 1994. "Application of Run by Run Controller to the Chemical-Mechanical Planarization Process." *IEEE/CPMT International Electronics Manufacturing Technology Symposium*, pp. 371-378.

Spanos, C. J., S. Leang, S.-Y. Ma, J. Thomson, B. Bombay, and X. Niu. May 1995. "A Multistep Supervisory Controller for Photolithographic Operations (Abstract)." *Proceedings of the Symposium on Process Control, Diagnostics, and Modeling in Semiconductor Manufacturing*, pp. 3-17.

Moyne, James, Roland Telfeyan, Arnon Hurwitz, and John Taylor. Aug. 1995. "A Process-Independent Run-to-Run Controller and Its Application to Chemical-Mechanical Planarization." *SEMI/IEEE Advanced semiconductor Manufacturing Conference and Workshop*. Ann Arbor, Michigan: The University of Michigan, Electrical Engineering & Computer Science Center for Display Technology & Manufacturiing.

Zhou, Zhen-Hong and Rafael Reif. Aug. 1995. "Epi-Film Thickness Measurements Using Emission Fourier Transform Infrared Spectroscopy—Part II: Real-Time in Situ Process Monitoring and Control." IEEE Transactions on Semiconductor Manufacturing, vol. 8, No. 3.

Telfeyan, Roland, James Moyne, Nauman Chaudhry, James Pugmire, Scott Shellman, Duane Boning, William Moyne, Arnon Hurwitz, and John Taylor. Oct. 1995. "A Multi-Level Approach to the Control of a Chemical-Mechanical Planarization Process." Minneapolis, Minnesota: 42nd National Symposium of the American Vacuum Society.

Chang, E., B. Stine, T. Maung, R. Divecha, D. Boning, J. Chung, K. Chang, G. Ray, D. Bradbury, O. S. Nakagawa, S. Oh, and D. Bartelink. Dec. 1995. "Using a Statistical Metrology Framework to Identify Systematic and Random Sources of Die- and Wafer-level ILD Thickness Variation in CMP Processes." Washington, D.C.: International Electron Devices Meeting.

Moyne, James R., Nauman Chaudhry, and Roland Telfeyan. 1995. "Adaptive Extensions to a Multi-Branch Run-to-Run Controller for Plasma Etching." *Journal of Vacuum Science and Technology*. Ann Arbor, Michigan: University of Michigan Display Technology Manufacturing Center.

Schmid, Hans Albrecht. 1995. "Creating the Architecture of a Manufacturing Framework by Design Patterns." Austin, Texas:OOPSLA.

Dishon, G., M. Finarov, R. Kipper, J.W. Curry, T. Schraub, D. Trojan, 4th Stambaugh, Y. Li and J. Ben-Jacob. Feb. 1996. "On-Line Integrated Metrology for CMP Processing." Santa Clara. California: VMIC Specialty Conferences, 1st International CMP Planarization Conference.

Leang, Sovarong, Shang-Yi Ma, John Thomson, Bart John Bombay, and Costas J. Spanos. May 1996. "A Control System for Photolithographic Sequences." *IEEE Transactions on Semiconductor Manufacturing*, vol. 9, No. 2.

Smith, Taber, Duane Boning, James Moyne, Arnon Hurwitz, and John Curry. June 1996. "Compensating for CMP Pad Wear Using Run by Run Feedback Control." Santa Clara, California: Proceedings of the Thirteenth International VLSI Multilevel Interconnection Conference. pp. 437-739.

Boning, Duane S., William P. Moyne, Taber H. Smith, James Moyne, Ronald Telfeyan, Arnon Hurwitz, Scott Shellman, and John Taylor. Oct. 1996. "Run by Run Control of Chemical-Mechanical Polishing." *IEEE Transactions on Components, Packaging, and Manufacturing Technology*—Part C, vol. 19, No. 4, pp. 307-314.

Zhe, Ning, J. R. Moyne, T. Smith, D. Boning, E. Del Castillo, Yeh Jinn-Yi, and Hurwitz. Nov. 1996. "A Comparative Analysis of Run-to-Run Control Algorithms in Semiconductor Manufacturing Industry (Abstract)." *IEEE/SEMI 1996 Advanced Semiconductor Manufacturing Conference Workshop*, pp. 375-381.

Yasuda, M., T. Osaka, and M. Ikeda. Dec. 1996. "Feedforward Control of a Vibration Isolation System for Disturbance Suppression (Abstract)." *Proceeding of the 35th IEEE Conference on Decision and Control*, vol. 2, pp. 1229-1233. Kobe, Japan.

Fan, Jr-Min, Ruey-Shan Guo, Shi-Chung, and Kian-Huei Lee. 1996. "Abnormal Trend Detection of Sequence-Disordered Data Using EWMA Method." *IEEE/SEMI Advanced Semiconductor Manufacturing Conference*, pp. 169-174.

SEMI. [1986] 1996. "Standard for Definition and Measurement of Equipment Reliability, Availability, and Maintainability (RAM)." SEMI E10-96.

Smith, Taber and Duane Boning. 1996. "A Self-Tuning EWMA Controller Utilizing Artificial Neural Network Function Approximation Techniques." *IEEE/CPMT International Electronics Manufacturing Technology Symposium*, pp. 355-363.

Guo, Ruey-Shan, Li-Shia Huang, Argon Chen, and Jin-Jung Chen. Oct. 1997. "A Cost-Effective Methodology for a Run-by-Run EWMA Controller." *6th International Symposium on Semiconductor Manufacturing*, pp. 61-64.

Mullins, J. A., W. J. Campbell, and A. D. Stock. Oct. 1997. "An Evaluation of Model Predictive Control in Run-to-Run Processing in Semiconductor Manufacturing (Abstract)." *Proceedings of the SPIE—The International Society for Optical Engineering Conference*, vol. 3213, pp. 182-189.

Reitman, E. A., D. J. Friedman, and E. R. Lory. Nov. 1997. "Pre-Production Results Demonstrating Multiple-System Models for Yield Analysis (Abstract)." *IEEE Transactions on Semiconductor Manufacturing*, vol. 10, No. 4, pp. 469-481.

Durham, Jim and Myriam Roussel. 1997. "A Statistical Method for Correlating In-Line Defectivity to Probe Yield." *IEEE/SEMI Advanced Semiconductor Manufacturing Conference*, pp. 76-77.

Shindo, Wataru, Eric H. Wang, Ram Akella, and Andrzej J. Strojwas. 1997. "Excursion Detection and Source Isolation in Defect Inspection and Classification." *2nd International Workshop on Statistical Metrology*, pp. 90-93.

Van Zant, Peter. 1997. *Microchip Fabrication: A Practical Guide to Semiconductor Processing*. Third Edition, pp. 472-478. New York, New York: McGraw-Hill.

Campbell, W. Jarrett, and Anthony J. Toprac. Feb. 11-12, 1998. "Run-to-Run Control in Microelectronics Manufacturing." Advanced Micro Devises, TWMCC.

Edgar, Thomas F., Stephanie W. Butler, Jarrett Campbell, Carlos Pfeiffer, Chris Bode, Sung Bo Hwang, and K.S. Balakrishnan. May 1998. "Automatic Control in Microelectronics Manufacturing: Practices, Challenges, and Possibilities." Automatica, vol. 36, pp. 1567-1603, 2000.

Moyne, James, and John Curry. Jun. 1998. "A Fully Automated Chemical-Mechanical Planarization Process." Santa Clara, California: VLSI Multilevel Interconnection (V-MIC) Conference.

Jul. 1998. "Active Controller: Utilizing Active Databases for Implementing Multistep Control of Semiconductor Manufacturing (Abstract)." *IEEE Transactions on Components, Packaging and Manufacturing Technology—Part C*, vol. 21, No. 3, pp. 217-224.

SEMI. Jul. 1998. *New Standard: Provisional Specification for CIM Framework Domain Architecture*. Mountain View, California: SEMI Standards. SEMI Draft Doc. 2817.

Consilium. Aug. 1998. *Quality Management Component: QMC™ and QMC-Link™ Overview*. Mountain View, California: Consilium, Inc.

Chemali, Chadi El, James Moyne, Kareemullah Khan, Rock Nadeau, Paul Smith, John Colt, Jonathan Chapple-Sokol, and Tarun Parikh. Nov. 1998. "Multizone Uniformity Control of a CMP Process Utilizing a Pre and Post-Measurement Strategy." Seattle, Washington: SEMETECH Symposium.

Consilium. 1998. *FAB300™*. Mountain View, California: Consilium, Inc.

Fang, S. J., A. Barda, T. Janecko, W. Little, D. Outley, G. Hempel, S. Joshi, B. Morrison, G. B. Shinn, and M. Birang. 1998. "Control of Dielectric Chemical Mechanical Polishing (CMP) Using and Interferometry Based Endpoint Sensor." *International Proceedings of the IEEE interconnect Technology Conference*, pp. 76-78.

Khan, Kareemullah, Victor Solakhain, Anthony Ricci, Tier Gu, and James Moyne. 1998. "Run-to-Run Control of ITO Deposition Process." Ann Arbor, Michigan.

Ouma, Dennis, Duane Boning, James Chung, Greg Shinn, Leif Olsen, and John Clark. 1998. "An Integrated Characterization and Modeling Methodology for CMP Dielectric Planarization." *Proceedings of the IEEE 1998 International Interconnect Technology Conference*, pp. 67-69.

Suzuki, Junichi and Yoshikazu Yamamoto. 1998. "Toward the Interoperable Software Design Models: Quartet of UML, XML, DOM and Corba." Proceedings IEEE International Software Engineering Standards Symposium. pp. 1-10.

Consilium. Jan. 1999. "FAB300™: Consilium's Next Generation MES Solution of Software and Services which Control and Automate Real-Time FAB Operations." www.consilium.com/products/fab300_page.htm#FAB300 Introduction.

Boning, Duane S., Jerry Stefani, and Stephanie W. Butler. Feb. 1999. "Statistical Methods for Semiconductor Manufacturing." *Encyclopedia of Electrical Engineering*, J. G. Webster, Ed.

McIntosh, John. Mar. 1999. "Using CD-SEM Metrology in the Manufacture of Semiconductors (Abstract)." *JOM*, vol. 51, No. 3, pp. 38-39.

Pan, J. Tony, Ping Li, Kapila Wijekoon, Stan Tsai, and Fritz Redeker. May 1999. "Copper CMP Integration and Time Dependent Pattern Effect." *IEEE 1999 International Interconnect Technology Conference*, pp. 164-166.

Klein, Bruce. Jun. 1999. "Application Development: XML Makes Object Models More Useful." Informationweek. pp. 1A-6A.

Baliga, John. Jul. 1999. "Advanced Process Control: Soon to be a Must." Cahners Semiconductor International. www.semiconductor.net/semiconductor/issues/issues/1999/jul99/docs/feature1.asp.

Consilium. Jul. 1999. "Increasing Overall Equipment Effectiveness (OEE) in Fab Manufacturing by Implementing Consilium's Next-Generation Manufacturing Execution System—MES II." Semiconductor Fabtech Edition 10.

Mackl, P. H. and K. Umemoto. Aug. 1999. "Achieving Fast Motions in Semiconductor Manufacturing Machinery (Abstract)." *Proceedings of the 1999 IEEE International Conference on Control Applications*, vol. 1, pp. 725-729. Kohala Coast, HI.

Consilium Corporate Brochure. Oct. 1999. www.consilium.com.

Khan, K., C. El Chemali, J. Moyne, J. Chapple-Sokol, R. Nadeau, P. Smith, C., and T. Parikh. Oct. 1999. "Yield Improvement at the Contact Process Through Run-to-Run Control (Abstract)." *24th IEEE/CPMT Electronics Manufacturing Technology Symposium*, pp. 258-263.

Moyne, James. Oct. 1999. "Advancements in CMP Process Automation and Control." Hawaii: (Invited paper and presentation to) Third International Symposium on Chemical Mechanical Polishing in IC Device Manufacturing: 196th Meeting of the Electrochemical Society.

Williams, Randy, Dadi Gudmundsson, Kevin Monahan, Raman Nurani, Meryl Stoller and J. George Shanthikumar. Oct. 1999. "Optimized Sample Planning for Wafer Defect Inspection," *Semiconductor Manufacturing Conference Proceedings, 1999 IEEE International Symposium on Santa Clara, CA*. Piscataway, NJ. pp. 43-46.

Consilium. Nov. 1999. *FAB300™ Update*.

Ruegsegger, Steven, Aaron Wagner, James S. Freudenberg, and Dennis S. Grimard. Nov. 1999. "Feedforward Control for Reduced Run-to-Run Variation in Micoelectronics Manufacturing." *IEEE Transactions on Semiconductor Manufacturing*, vol. 12, No. 4.

1999. "Contactless Bulk Resistivity/Sheet Resistance Measurement and Mapping Systems." www.Lehighton.com/fabtech1/index.html.

Nov. 1999. "How to Use EWMA to Achieve SPC and EPC Control." *International Symposium on NDT Contribution to the Infrastructure Safety Systems*, Tores, Brazil. <http://www.ndt.net/abstract/ndtiss99/data/35.htm>.

Edgar, T. F., W. J. Campbell, and C. Bode. Dec. 1999. "Model-Based Control in Microelectronics Manufacturing." *Proceedings of the 38th IEEE Conference on Decision and Control*, Phoenix, Arizona, vol. 4, pp. 4185-4191.

Meckl, P. H. and K. Umemoto. Apr. 2000. "Achieving Fast Motions by Using Shaped Reference Inputs <Semiconductor Manufacturing Machine> (Abstract)." *NEC Research and Development*, vol. 41, No. 2, pp. 232-237.

Chemali, Chadi El, James Moyne, Kareemullah Khan, Rock Nadeau, Paul Smith, John Colt, Jonathan Chapple-Sokol, and Tarun Parikh. Jul./Aug. 2000, "Multizone Uniformity Control of a Chemical Mechanical Polishing Process Utilizing a Pre- and Postmeasurement Strategy." J. Vac. Sci. Technol. A, vol. 18(4). pp. 1287-1296. American Vacuum Society.

Oechsner, R., T. Tschaftary, S. Sommer, L. Pfitzner, H. Ryssel, H. Gerath, C. Baier, and Hafner. Sep. 2000. "Feed-forward Control for a Lithography/Etch Sequence (Abstract)." *Proceedings of the SPIE—The International Society for Optical Engineering Conference*, vol. 4182, pp. 31-39.

Cheung, Robin. Oct. 18, 2000. "Copper Interconnect Technology." *AVS/CMP User Group Meeting*, Santa Clara, CA.

Edgar, Thomas F., Stephanie W. Butler, W. Jarrett Campbell, Carlos Pfeiffer, Christopher Bode, Sung Bo Hwang, K. S. Balakrishnan, and J. Hahn. Nov. 2000. "Automatic Control in Microelectronics Manufacturing: Practices, Challenges, and Possibilities (Abstract)." *Automatica*, v. 36, No. 11.

Khan, S., M. Musavi, and H. Ressom. Nov. 2000. "Critical Dimension Control in Semiconductor Manufacturing (Abstract)." *ANNIE 2000. Smart Engineering Systems Design Conference*, pp. 995-1000. St. Louis, Missouri.

ACM Research Inc. 2000. "Advanced Copper Metallization for 0.13 to 0.05 µm & Beyond." <http://acmrc.com/press/ACM-ECP-brochure.pdf>.

Ravid, Avi, Avner Sharon, Amit Weingarten, Vladimir Machavariani, and David Scheiner. 2000. "Copper CMP Planarity Control Using ITM." *IEEE/SEMI Advanced Semiconductor Manufacturing Conference*, pp. 437-443.

SEMI. 2000. "Provisional Specifications for CIM Framework Scheduling Component." San Jose, Califorina. SEMI E105-1000.

2000. "Microsense II Capacitance Gaging System." www.adetech.com.

Chen, Argon and Ruey-Shan Guo. Feb. 2001. "Age-Based Double EWMA Controller and Its Application to CMP Processes." *IEEE Transactions on Semiconductor Manufacturing*, vol. 14, No. 1, pp. 11-19.

Mar. 5, 2001, "KLA-Tencor Introduces First Production-worthy Copper CMP In-situ Film Thickness and End-point Control System." http://www.kla-tencor.com/j/servlet/NewsItem?newsItemID=74.

Lee, Brian, Duane S. Boning, Winthrop Baylies, Noel Poduje, Pat Hester, Yong Xia, John Valley, Chris Koliopoulus, Dale Hetherington, HongJiang Sun, and Michael Lacy. Apr. 2001. "Wafer Nanotopgraphy Effects on CMP: Experimental Validation of Modeling Methods." San Francisco. California: Materials Research Society Spring Meeting.

Tobin, K. W., T. P. Karnowski, L. F. Arrowood, and F. Lakhani. Apr. 2001. "Field Test Results of an Automated Image Retrieval System (Abstract)." *Advanced Semiconductor Manufacturing Conference, 2001 IEEE/SEMI*, Munich, Germany.

Tan, K. K., H. F. Dou, and K. Z. Tang. May-Jun. 2001. "Precision Motion Control System for Ultra-Precision Semiconductor and Electronic Components Manufacturing (Abstract)." *51st Electronic Components and Technology Conference 2001. Proceedings*, pp. 1372-1379, Orlando, Florida.

Jensen, Alan, Peter Renteln, Stephen Jew, Chris Raeder, and Patrick Cheung. Jun. 2001. "Empirical-Based Modeling for Control of CMP Removal Uniformity." Solid State Technology, vol. 44, No. 6, pp. 101-102, 104, 106. Cowan Publ. Corp.: Washington, D.C.

Jul. 5, 2001. "Motorola and Advanced Micro Devices Buy ObjectSpace Catalyst Advanced Process Control Product for Five Wafer Fabs." Semiconductor FABTECH. www.semiconductorfabtech.com/industry.news/9907/20.07.shtml.

Heuberger, U. Sep. 2001. "Coating Thickness Measurement with Dual-Function Eddy-Current & Magnetic Inductance Instrument (Abstract)." *Galvanotechnik*, vol. 92, No. 9, pp. 2354-2366+IV.

Pilu, Maurizio. Sep. 2001. "Undoing Page Curl Distortion Using Applicable Surfaces." *IEEE International Conference on Image Processing*. Thessalonica, Greece.

Oct. 15, 2001, Search Report prepared by the Austrian Patent Office for Singapore Patent Application No. 200004286-1.

Wang, LiRen and Hefin Rowlands. 2001. "A Novel NN-Fuzzy-SPC Feedback Control System." *8th IEEE International Conference on Emerging Technologies and Factory Automation*, pp. 417-423.

NovaScan 2020. Feb. 2002. "Superior Integrated Process Control for Emerging CMP High-End Applications."

Mar. 15, 2002. Office Action for U.S. Appl No. 09/469,227, filed Dec. 22, 1999.

Mar. 29, 2002. Office Action for U.S. Appl. No. 09/363,966, filed Jul. 29, 1999.

Moyne, J., V. Solakhian, A. Yershov, M. Anderson, and D. Mockler-Hebert. Apr.-May 2002. "Development and Deployment of a Multi-Component Advanced Process Control System for an Epitaxy Tool (Abstract)." *2002 IEEE Advanced Semiconductor Manufacturing Conference and Workshop*, pp. 125-130.

Sarfaty, Moshe, Arulkumar Shanmugasundram, Alexander Schwarm, Joseph Paik, Jimin Zhang, Rong Pan, Martin J. Seamons, Howard Li, Raymond Hung, and Suketu Parikh. Apr.-May 2002. "Advance Process Control Solutions for Semiconductor Manufacturing." Boston, Massachusetts: *13th Annual IEEE/SEMI Advanced Semiconductor Manufacturing Conference. Advancing the Science and Technology of Semiconductor Manufacturing. ASMC 2002*, pp. 101-106.

Campbell, W. J., S. K. Firth, A. J. Toprac, and T. F. Edgar. May 2002. "A Comparison of Run-to-Run Control Algorithm (Abstract)." *Proceedings of 2002 American Control Conference*, vol. 3, pp. 2150-2155.

Good, Richard and S. Joe Qin. May 2002. "Stability Analysis of Double EWMA Run-to-Run Control with Metrology Delay." *IEEE/CPMT International Electronics Manufacturing Technology Symposium*, pp. 355-363.

Smith, Stewart, Anthony J. Walton, Alan W. S. Ross, Georg K. H. Bodammer, and J. T. M. Stevenson. May 2002. "Evaluation of Sheet Resistance and Electrical Linewidth Measurement Techniques for Copper Damascene Interconnect." *IEEE Transactions on Semiconductor Manufacturing*, vol. 15, No. 2, pp. 214-222.

Johnson, Bob. Jun. 10, 2002. "Advanced Process Control Key to Moore's Law." Gartner, Inc.

Jun. 20, 2002. Office Action for U.S. Appl. No. 09/619,044, filed Jul. 19, 2000.

Itabashi, Takeyuki, Hiroshi Nakano, and Haruo Akahoshi. Jun. 2002. "Electroless Deposited CoWB for Copper Diffusion Barrier Metal." *IEEE International Interconnect Technology Conference*, pp. 285-287.

Jul. 9, 2002. International Search Report for PCT/US01/24910.

Jul. 23, 2002. Communication Pursuant to Article 96(2) EPC for European Patent Application No. 00 115 577.9.

Jul. 29, 2002. International Search Report for PCT/US01/27407.

Sep. 26, 2002. Office Action for U.S. Appl. No. 09/637,620, filed Aug. 11, 2000.

Oct. 4, 2002, International Search Report for PCT/US01/22833.

Oct. 15, 2002. International Search Report for PCT/US02/19062.

Oct. 23, 2002. International Search Report for PCT/US01/27406.

Nov. 7, 2002. International Search Report for PCT/US02/19061.

Nov. 11, 2002. International Search Report for PCT/US02/19117.

Nov. 12, 2002. International Search Report for PCT/US02/19063.

ACM Research, Inc. 2002. "ACM Ultra ECP® System: Electro-Copper Plating (ECP) Deposition." www.acmrc.com/ecp.html.

Applied Materials, Inc. 2002. "Applied Materials: Information for Everyone: Copper Electrochemical Plating." www.appliedmaterials.com/products/copper_electrochemical_plating.html.

KLA-Tencor Corporation. 2002. "KLA Tencor: Press Release: KLA-Tencor Introduces First Production-Worthy Copper CMP In-Situ Film Thickness and End-point Control System: Multi-Million Dollar Order Shipped to Major CMP Tool Manufacturer." www.kla-tencor.com/news_events/press_releases/press_releases2001/984086002.html.

Takahashi, Shingo, Kaori Tai, Hiizu Ohtorii, Naoki Komai, Segawa, Hiroshi Horikoshi, Zenya Yasuda, Hiroshi Yamada, Masao Ishihara, and Takeshi Nogami. 2002. "Fragile Porous Low-k/Copper Integration by Using Electro-Chemical Polishing." *2002 Symposium on VLSI Technology Digest of Technical Papers*, pp. 32-33.

2002. "Microsense II—5810: Non-Contact Capacitance Gaging Module." www.adetech.com.

Mar. 25, 2003. International Search Report for PCT/US02/24859.

May 23, 2003. Written Opinion for PCT/US01/24910.

Jul. 23, 2003. Invitation to Pay Additional Fees and Communication Relating to the Results of the Partial International Search PCT/US02/19116.

Aug. 1, 2003. Written Opinion for PCT/US01/27406.

Aug. 8, 2003. PCT International Search Report from PCT/US03/08513.

Aug. 20, 2003. Written Opinion for PCT/US01/22833.

Oct. 14, 2003. PCT International Search Report from PCT/US02/21942.

Oct. 20, 2003. PCT International Search Report from PCT/US02/19116.

Oct. 23, 2003. PCT International Preliminary Examination Report from PCT/US01/24910.

"NanoMapper wafer nanotopography measurement by ADE Phase Shift." Printed Dec. 9, 2003. http://www.phase-shift.com/nanomap.shtml.

"Wafer flatness measurement of advanced wafers." Printed Dec. 9, 2003. http://www.phase-shift.com/wafer-flatness.shtml.

"ADE Technologies, Inc.—6360." Printed Dec. 9, 2003. http://www.adetech.com/6360.shtml.

"optical profilometer MicroXAM by ADE Phase Shift." Printed Dec. 9, 2003. http://www.phase-shift.com/microxam.shtml.

"NanoMapper FA factory automation wafer nanotopography measurement." Printed Dec. 9, 2003. http://www.phase-shift.com/nanomapperfa.shtml.

Dec. 11, 2003. Office Action for U.S. Appl. No. 09/943,383, filed Aug. 31, 2001.

Dec. 16, 2003. International Search Report PCT/US03/23964.

Cunningham, James A. 2003. "Using Electrochemistry to Improve Copper Interconnects." <http://www.e-insite.net/semiconductor/index.asp?layout=article&articleid=CA47465>.

Jan. 20, 2004. Office Action for U.S. Appl. No. 09/927,444, filed Aug. 13, 2001.

Jan. 23, 2004. International Search Report for PCT/US02/24860.

Feb. 2, 2004. Office Action for U.S. Appl. No. 09/363,966, filed Jul. 29, 1999.

Adams, Bret W., Bogdan Swedek, Rajeev Bajaj, Fritz Redeker, Manush Birang, and Gregory Amico. "Full-Wafer Endpoint Detection Improves Process Control in Copper CMP." *Semiconductor Fabtech*—12$^{th}$ Edition. Applied Materials, Inc., Santa Clara, CA.

Berman, Mike, Thomas Bibby, and Alan Smith. "Review of In Situ & In-line Detection for CMP Applications." *Semiconductor Fabtech*, 8$^{th}$ Edition, pp. 267-274.

Dishon, G., D. Eylon, M. Finarov, and A.Shulman. "Dielectric CMP Advanced Process Control Based on Integrated Monitoring." Ltd. Rehoveth, Israel: Nova Measuring Instruments.

"Semiconductor Manufacturing: An Overview." <http://users.ece.gatech.edu/~gmay/overview.html>.

Sep. 15, 2004. Office Action for U.S. Appl. No. 10/632,107, filed Aug. 1, 2003.

Sep. 29, 2004. Office Action for U.S. Appl. No. 09/363,966, filed Jul. 29, 1999.

Oct. 1, 2004, International Preliminary Examination Report for PCT Serial No. PCT/US03/23964.

Oct. 6, 2004. Office Action for U.S. Appl. No. 10/759,108, filed Jan. 20, 2004.

Oct. 12, 2004, International Preliminary Examination Report for PCT Serial No. PCT/US02/19061.

Nov. 17, 2004. Written Opinion for PCT Serial No. PCT/US01/27407.

Nov. 19, 2004. International Search Report for PCT Application No. PCT/US03/36501.

US 6,150,664, 11/2000, Su (withdrawn)

* cited by examiner

METHOD, SYSTEM AND MEDIUM FOR CONTROLLING MANUFACTURE PROCESS HAVING MULTIVARIATE INPUT PARAMETERS

RELATED APPLICATION

This application claims priority from U.S. Provisional Application No. 60/426,393, filed Nov. 15, 2002, which is incorporated herein by reference.

FIELD OF THE INVENTION

The present invention relates to a method, system and medium for modeling and controlling processes. More specifically, the present invention relates to modeling and controlling semiconductor-processing equipment that has multivariate input parameters.

BACKGROUND OF THE INVENTION

In manufacturing products that include precision discrete parts (e.g., microelectronic chips on silicon substrates), controlling manufacturing processes plays a crucial role. Controlling such processes may require, among other things, monitoring the characteristics of manufactured parts (e.g., processed wafers, hereinafter referred to as outputs) and adjusting input parameters accordingly. By adjusting the values of the input parameters, different types of outputs can be produced and the characteristics of the outputs can also be controlled.

For automating the control of the manufacturing processes, a mathematical model of the processing equipment can be used. One example of such a model is called a predictive model. This model is used to predict the future output values (e.g., the characteristics of products) based on historical information (e.g., input parameter values and the corresponding output qualities).

One such predictive model is an offset technique, which is illustrated in FIG. 1. In particular, the values of a number of input parameters 101 are received by an input/output dependency model 103, which calculates a predicted output value $y_1^{Pred}$ 105 based on the input values. A corrector 109 then compares the predicted value $y_1^{Pred}$ with an actual output value $y_1^a$ 107 for the given values of the input parameters. If the predicted and actual output values are similar to each other within a certain range, no change is made to the input/output dependency model 103. If the predicted and actual output values are different (e.g., outside the range) from each other, the predictor input/output dependency model 103 is modified by adjusting an offset value ($O_1$) 111 based on the magnitude of the difference.

In equipment that has more than one output, at least some of the outputs may include mutual (shared) inputs. This means the output values of the equipment are not completely independent from each other (e.g., changing an input to adjust a given output may unintentionally change the characteristics of other outputs). In a conventional modeling technique, each output has its own correction system as if the output values are independent from each other. Because the dependencies between the different outputs are not accounted for by the conventional technique, it does not always lead to accurate predictions. In addition, adjusting one offset of one output can affect other outputs.

SUMMARY OF THE INVENTION

Embodiments of the present invention advantageously overcome the above-described shortcomings of the aforementioned techniques. More specifically, embodiments of the present invention provide a system, method and medium for controlling semiconductor-processing equipment that has multivariate input parameters and outputs.

Embodiments of the present invention minimize the effects of outputs being interdependent from each other. This is achieved by providing input parameter transformations having transformation coefficients. The coefficients are obtained by minimizing a score function. This, in turn, allows accurate models to be obtained. Using the models, highly precise control of manufacturing equipment is accomplished.

In particular, an example method according to embodiments of the present invention includes the steps of identifying at least one input that causes a change in at least two of a plurality of outputs, storing values of the identified inputs and corresponding empirical output values, and calculating and storing predicted output values, based on, in part, the values of the identified inputs. The example method may further include the steps of calculating a set of transform coefficients by minimizing a score equation that is a function of, in part, differences between one or more of the empirical output values and their corresponding predicted output values, and calculating one or more input values for one or more desired output values based on, in part, the calculated set of transform coefficients.

BRIEF DESCRIPTION OF THE DRAWINGS

The detailed description of the present application showing various distinctive features may be best understood when the detailed description is read in reference to the appended drawings in which.

DETAILED DESCRIPTION

Embodiments of the present invention generally provide systems, methods and mediums for creating one or more adaptive process models to mathematically represent multivariate input parameter systems. The present invention is particularly applicable in a manufacturing process such as manufacturing and/or processing semiconductor wafers. In particular, the present invention relates to modeling techniques as used by equipment involved in the manufacturing of semiconductor wafers. A general overview of embodiments of the present invention is provided below. It will be followed by a specific example implementation of the present invention.

Figure 1:
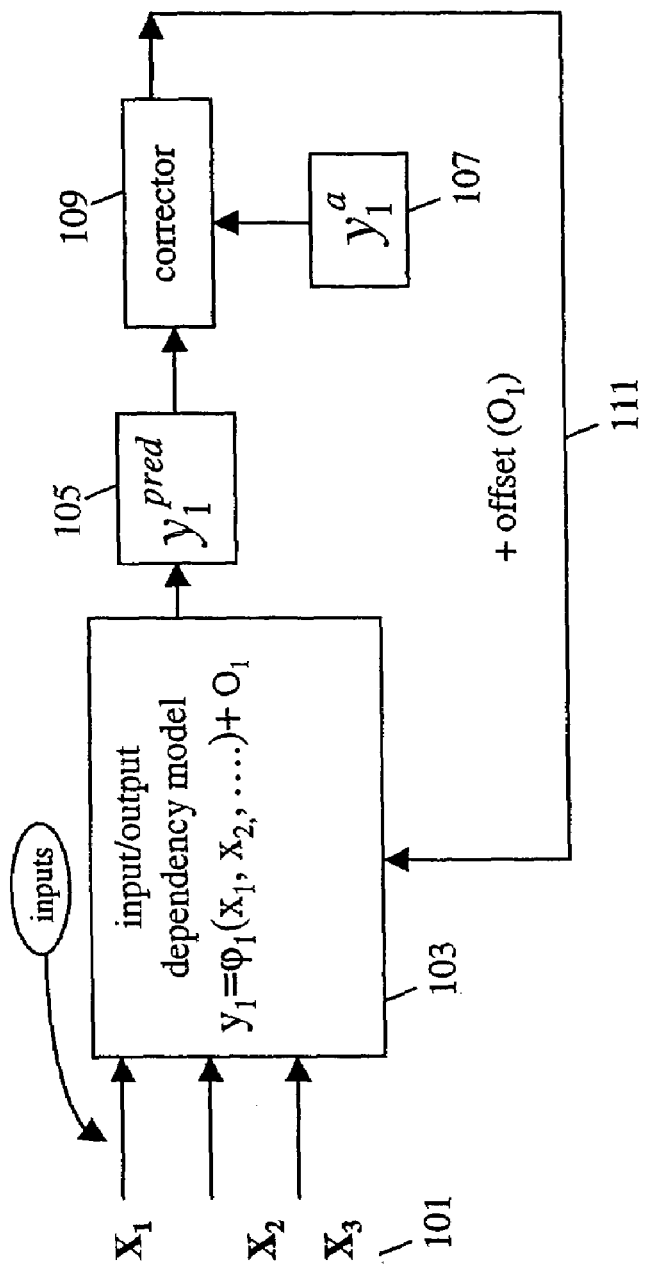
FIG. 1 is a diagram showing a conventional offset model.
Figure 2:
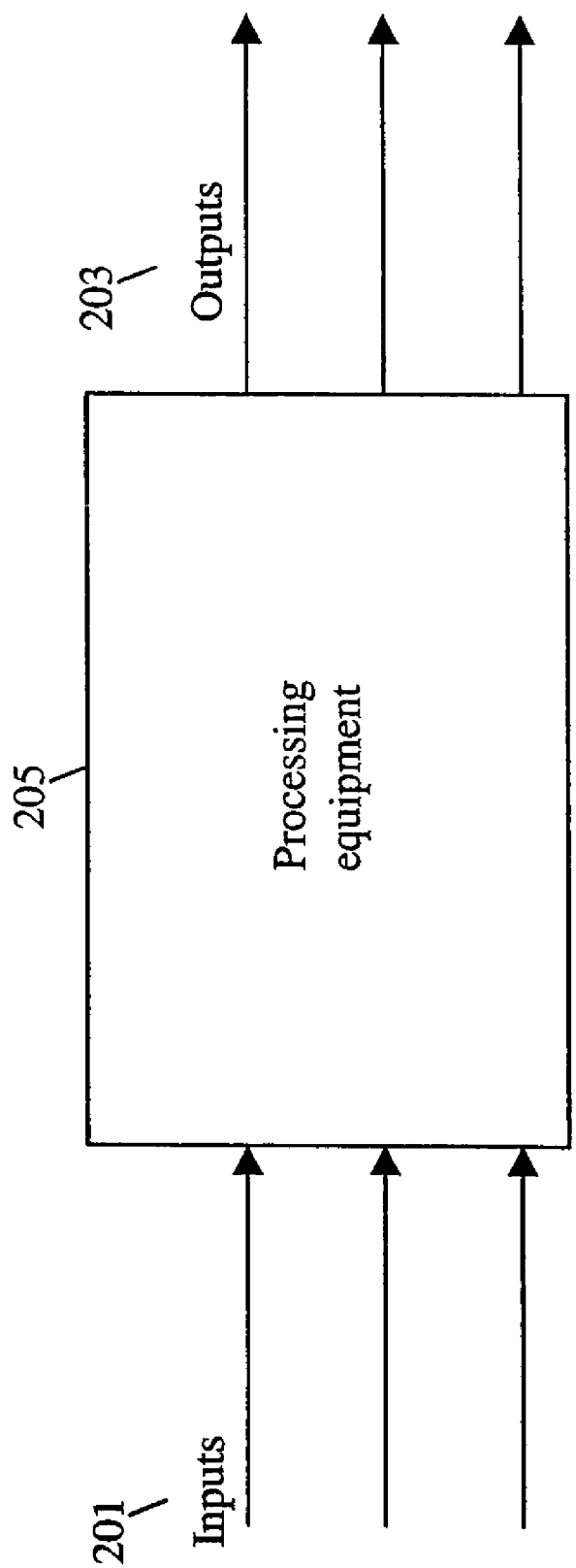
FIG. 2 is a diagram illustrating processing equipment.

Before discussing embodiments of the present invention, FIG. 2 shows a simplified graphical representation of processing equipment 205 with input parameters 201 and outputs 203. Examples of processing equipment include etcher tools, deposition tools, chemical mechanical planarization (CMP) tools, etc. The processing equipment 205 can include one or more tools. Depending upon the values of the input parameters 201, different processes can be achieved. For instance, in a deposition tool, different types of layers can be deposited on a wafer and/or the thickness of the layer can be varied.

Figure 3:
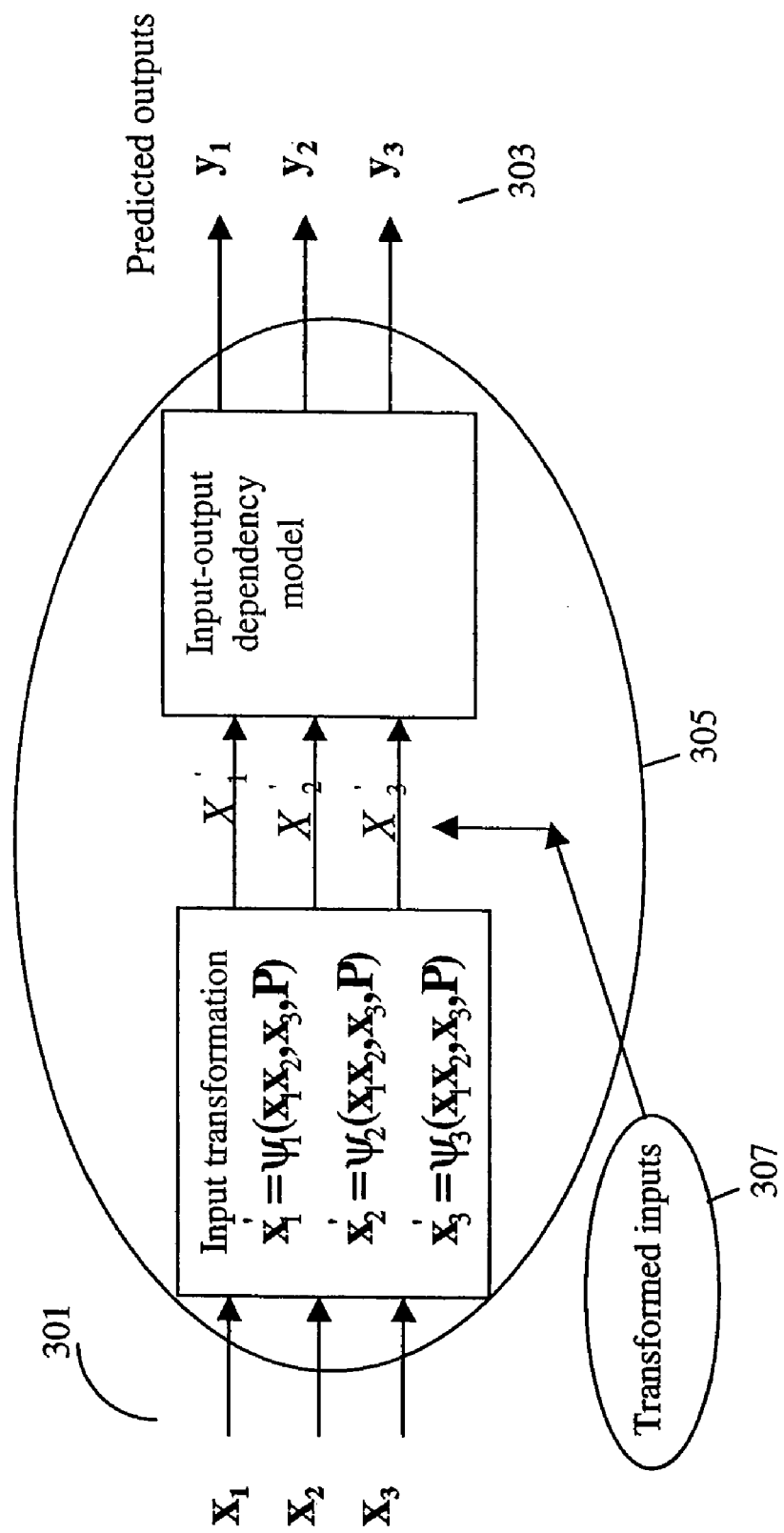
FIG. 3 is a diagram illustrating a model of the processing equipment shown in FIG. 2 in accordance with embodiments of the present invention.

As a general overview of embodiments of the present invention, in FIG. 3, the processing equipment 205 has a set of input parameters 301, a set of predicted outputs 303, and a prediction model 305 therebetween (replacing the processing equipment of FIG. 2). The overall goal of the prediction model is to minimize differences between the predicted output values and empirically collected output values (i.e., the actual output values). Once the prediction model is optimized (e.g., the differences between the predicted and actual output values have been minimized), the model can then be used in setting input parameters based on desired output values. In other words, for a given set of desired output values, the model can be used in a reverse fashion to calculate the input parameter values that would cause output values close to the desired output values. The calculated input parameter values are also known as recipes.

In embodiments of the present invention, the step of obtaining the predictive model can be divided into two steps. The first is to transform the values of the input parameters 301 into transformed input values 307. The second is to use the transformed input values 307 in calculating predicted output values 303.

With respect to the transformation, input parameter values $(X_1, X_2, X_3)$ along with coefficient vector $\vec{P}$ are transformed into $(X'_1, X'_2, \text{ and } X'_3)$ by transform functions $\psi_1$, $\psi_2$, and $\psi_3$. Examples of transformation functions include:

1) $X'_1 = PX_1$; $X'_2 = PX_2$ (In this example, the value of $\vec{P}$ is identical for both X1 and X2.)
2) $X'_1 = P_{11}X_1 + P_{12}X_1^2$; $X'_2 = P_{21}X_1 + P_{22}X_2^2 + P_{cross} X_1 X_2$ (In this example, $P_{11}$, $P_{12}$, $P_{21}$, $P_{22}$ and $P_{cross}$ can have different values.)

The coefficient values are calculated by the steps of: a. collecting historical information on input parameter values and actual output values; b. creating a score function based on the collected information; and c. finding the coefficient values that minimize the score function, $S_p$.

The above steps are described by making references to semiconductor processing tools. As such, the step of collecting the historical information entails a set of data points for processing a number of wafers. In particular, input parameter values and actual output values for a number of wafers that have been processed by the processing equipment would be collected. This collection would then be used in the next step of minimizing the score function.

Here, the score function, $S_p$, is:

$$S_p = \sum_{i,k} W_{i,k} \left( y_{actual}^{ik} - y_{predicted}^{ik} \left( \vec{X}^{i\prime} \left( \vec{X}^i, \vec{P} \right) \right) \right)^2$$

where:
i—number of wafer;
k—number of output;
$y_{actual}$—an actual output value;
$y_{predicted}$—a predicted output value, as calculated based on transformed inputs for a particular wafer i ($\vec{X}^{i\prime}$);

$\vec{X}^{i\prime} = (X_1^{i\prime}, X_2^{i\prime}, X_3^{i\prime})$ is the transformed input vector, calculated on the base of the actual input; and $\vec{X}^i = (X_1^i, X_2^i, X_3^i)$ for wafer i together with the transformation parameters $\vec{P}$. This calculation is performed using the following transformation functions:

$$\psi_1(X_1, X_2, X_3, \vec{P}); \psi_2(X_1, X_2, X_3, \vec{P}); \text{ and } \psi_3(X_1, X_2, X_3, \vec{P}).$$

The next step, as noted above, is to minimize the score $S_p$, i.e., to find $\vec{P}$ values that provide the minimum of $$S_p \left( S_p \xrightarrow[p]{} \min \right)$$

The above-described steps calculate an optimal $\vec{P}$ (i.e., a vector of coefficients for input transformation functions) such that the prediction model of the present invention provides the closest possible predicted outputs to the actual outputs. In a processing model with multivariate input parameters, when the score is minimized, the negative effect of the interdependencies between output values on the model accuracy would also be minimized.

Figure 4:
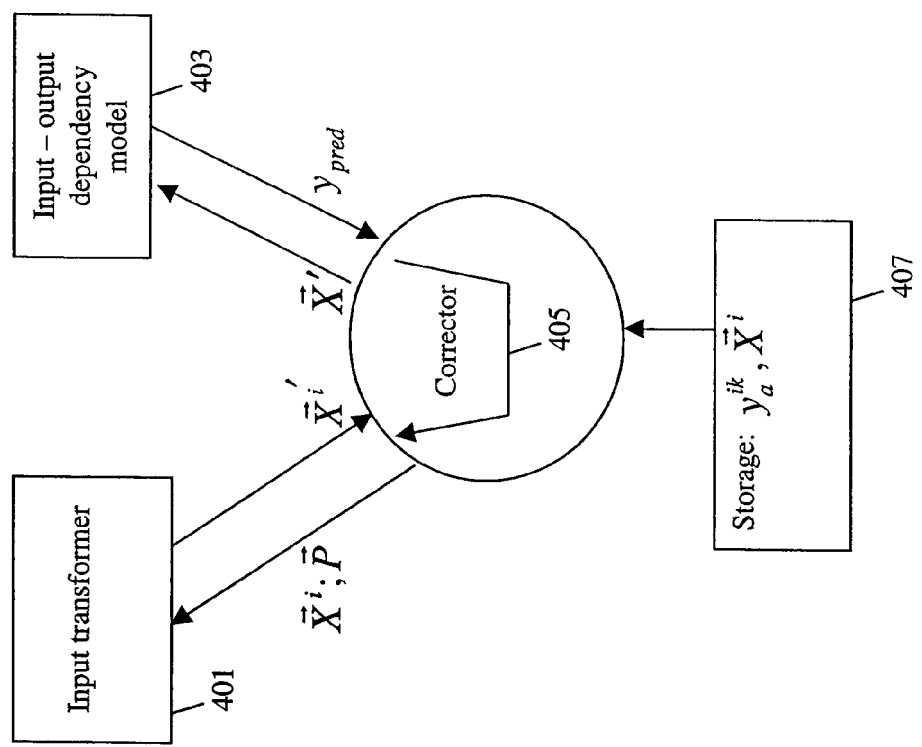
FIG. 4 is a block diagram illustrating various components of embodiments of the present invention.

Now turning to describe an example implementation of the embodiments described above, as shown in FIG. 4, the example implementation includes a number of components: an input transformer 401, an input-output dependency model 403, a corrector 405 and a storage device 407. All these components can be implemented in hardware, firmware, software and/or any combination thereof.

Figure 5:
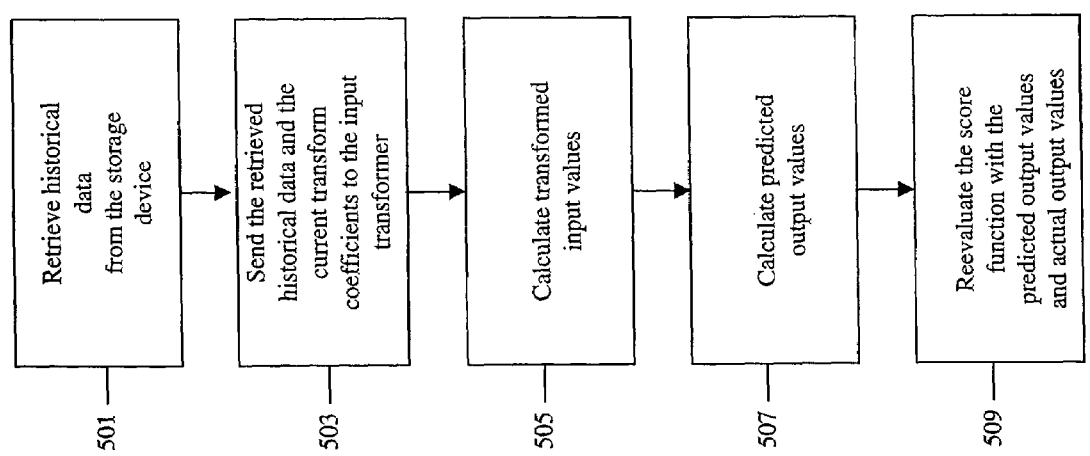
FIG. 5 is a flow chart illustrating processing steps of embodiments of the present invention.

These components are further explained by also referring to FIG. 5. In particular, the historical information (i.e., $y_a^{ik}$, $\vec{X}^i$) is stored into the storage device 407. The corrector 405 then retrieves the historical information ($y_a^{ik}$, $\vec{X}^i$) from the storage device 407 (step 501). Since the retrieved historical information contains raw input parameter values, the information is sent to the input transformer 401 along with coefficients $\vec{P}$ (step 503). The coefficient $\vec{P}$ can be stored in the storage device 407 or in the corrector 405.

The input transformer 401, upon receiving the information from the corrector 405, calculates transformed input parameter values $\vec{X}^{i\prime}$ (step 505). Once the transformed input parameter values are calculated, the input transformer 401 sends the transformed input values to the corrector 405.

The corrector 405, upon receiving the transformed input parameter values from the input transformer 401, sends the transformed input parameter values to the input/output dependence model 403. The input/output dependency model 403 then calculates predicted output parameter values $y_{pred}$ (step 507). The corrector 405 then calculates the score $S_p$, and sets a new $\vec{P}$ (a vector of parameters of input transformation functions) in order to minimize the score $S_p$ (step 509). These steps can be repeated until an optimum $\vec{P}$ that yields a minimal score $S_p$ is obtained, and return the optimum $\vec{P}$. Each time new data is obtained, a new score from new data is created and a new optimum $\vec{P}$ value is calculated. This newly calculated vector $\vec{P}$ could be used for transforming the input values, meaning: $\vec{P}_{new} \equiv \vec{P}_{optimum}$.

In embodiments of the present invention, the optimum coefficients can be combined with the most recent vector such that: $\vec{P}_{new} \equiv \vec{P}_{previous} + K(\vec{P}_{optimum} - \vec{P}_{previous})$ wherein K<1.

As a new set of data points arrives, a new optimum $\vec{P}$ can be recalculated.

Once a set of coefficients is calculated, a set of input values can be obtained (e.g., a recipe) for a desired set of output values. More specifically, from a set of desired values, a set of transformed input values, $\vec{X}^{i'}$, can be obtained by reversing the predictive model (e.g., the input/output dependence model 403). The transformed input values can then be reverse transformed using the coefficients $\vec{P}$ to obtain the input value to produce the desired output values.

Figure 6:
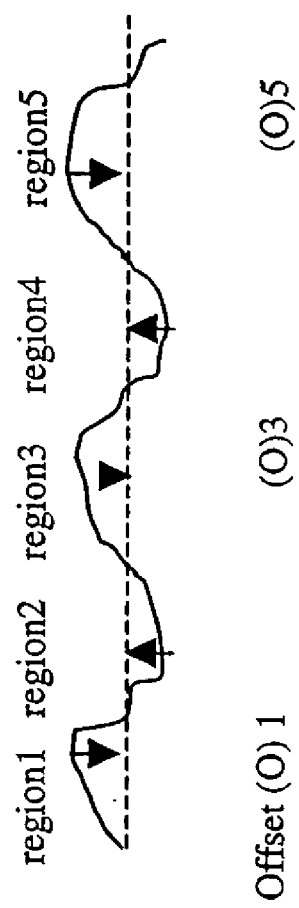
FIG. 6 is a diagram illustrating a CMP process.

In the above-described embodiments, the raw input values are transformed using the calculated coefficients. The transformation is required to account for the dependencies among input parameters as graphically illustrated in FIG. 6. More specifically, a surface of a wafer having five regions with varying degrees of roughness is to be polished by a CMP process. The goal is to achieve a flat surface depicted by a dotted line in FIG. 6. In conventional techniques, one region would be polished without regard to the other regions. However, polishing one region can affect the polishing of another region (e.g., when an offset is applied in region 1 in order to bring the height in region 1 down to the broken line, the height in region 2 is also influenced by the changes of region 1). Using the embodiments of the present invention, these dependencies are accounted for.

Figure 7:
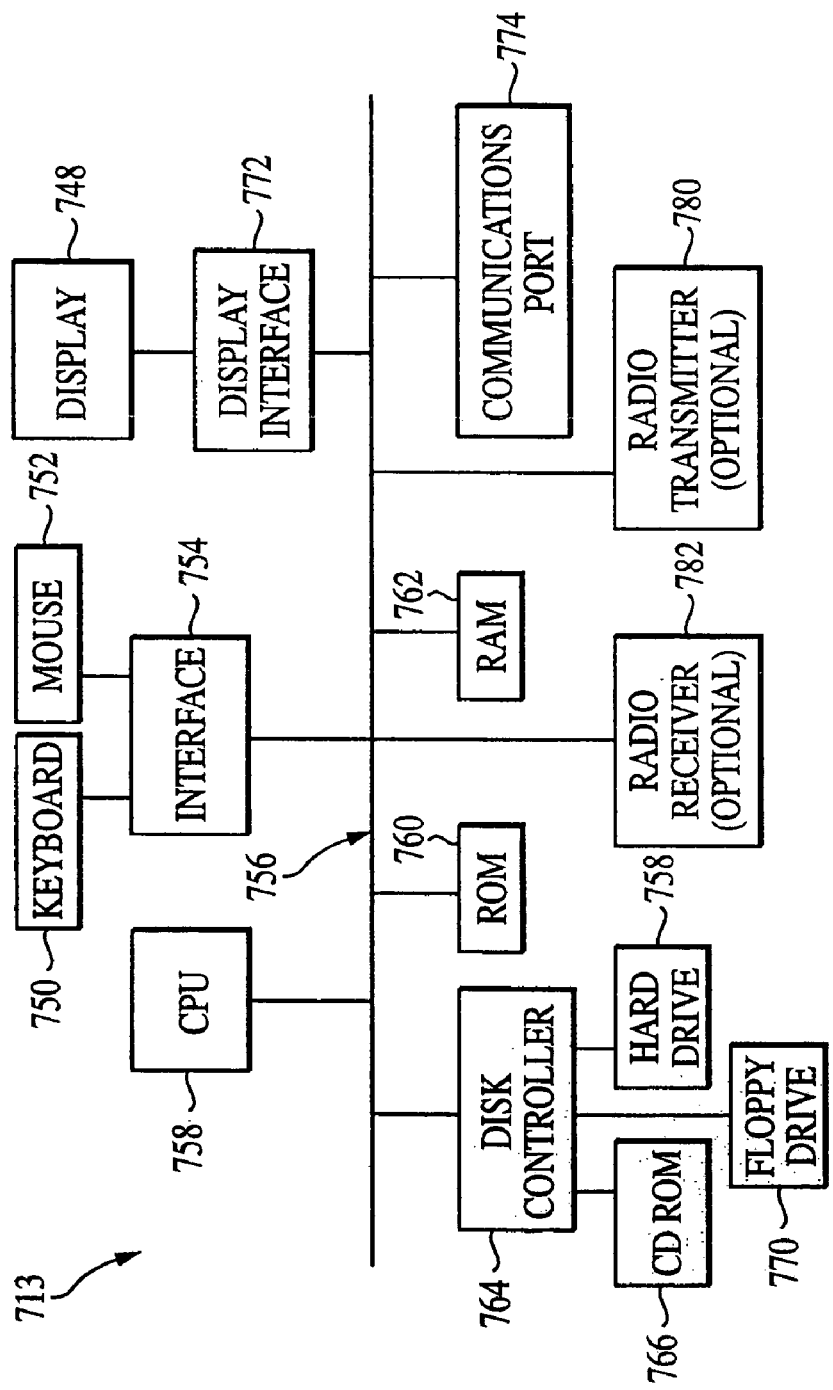
FIG. 7 is a block diagram representation of an example embodiment of a computer configured to perform embodiments of the present invention.

An example embodiment of the computer in which embodiments of the present invention operate (e.g., the various components described in FIG. 4) is described below in connection with FIGS. 7-8. FIG. 7 illustrates a block diagram of one example of the internal hardware 713 of a computer configured to perform embodiments of the present invention. A bus 756 serves as the main information highway interconnecting various components therein. CPU 758 is the central processing unit of the internal hardware 713, performing calculations and logic operations required to execute embodiments of the present invention as well as other programs. Read only memory (ROM) 760 and random access memory (RAM) 762 constitute the main memory. Disk controller 764 interfaces one or more disk drives to the system bus 756. These disk drives are, for example, floppy disk drives 770, or CD ROM or DVD (digital video disks) drives 766, or internal or external hard drives 768. These various disk drives and disk controllers are optional devices.

A display interface 772 interfaces display 748 and permits information from the bus 756 to be displayed on display 748. Communications with external devices, such as the other components of the system described above, occur utilizing, for example, communication port 774. Optical fibers and/or electrical cables and/or conductors and/or optical communication (e.g., infrared, and the like) and/or wireless communication (e.g., radio frequency (RF), and the like) can be used as the transport medium between the external devices and communication port 774. Peripheral interface 754 interfaces the keyboard 750 and mouse 752, permitting input data to be transmitted to bus 756. In addition to these components, the internal hardware 713 also optionally includes an infrared transmitter and/or infrared receiver. Infrared transmitters are optionally utilized when the computer system is used in conjunction with one or more of the processing components/stations/modules that transmit/receive data via infrared signal transmission. Instead of utilizing an infrared transmitter or infrared receiver, the computer system may also optionally use a low power radio transmitter 780 and/or a low power radio receiver 782. The low power radio transmitter transmits the signal for reception by components of the production process, and receives signals from the components via the low power radio receiver. The low power radio transmitter and/or receiver are standard devices in industry.

Although the computer in FIG. 7 is illustrated having a single processor, a single hard disk drive and a single local memory, the analyzer is optionally suitably equipped with any multitude or combination of processors or storage devices. For example, the computer may be replaced by, or combined with, any suitable processing system operative in accordance with the principles of embodiments of the present invention, including sophisticated calculators, and hand-held, laptop/notebook, mini, mainframe and super computers, as well as processing system network combinations of the same.

Figure 8:
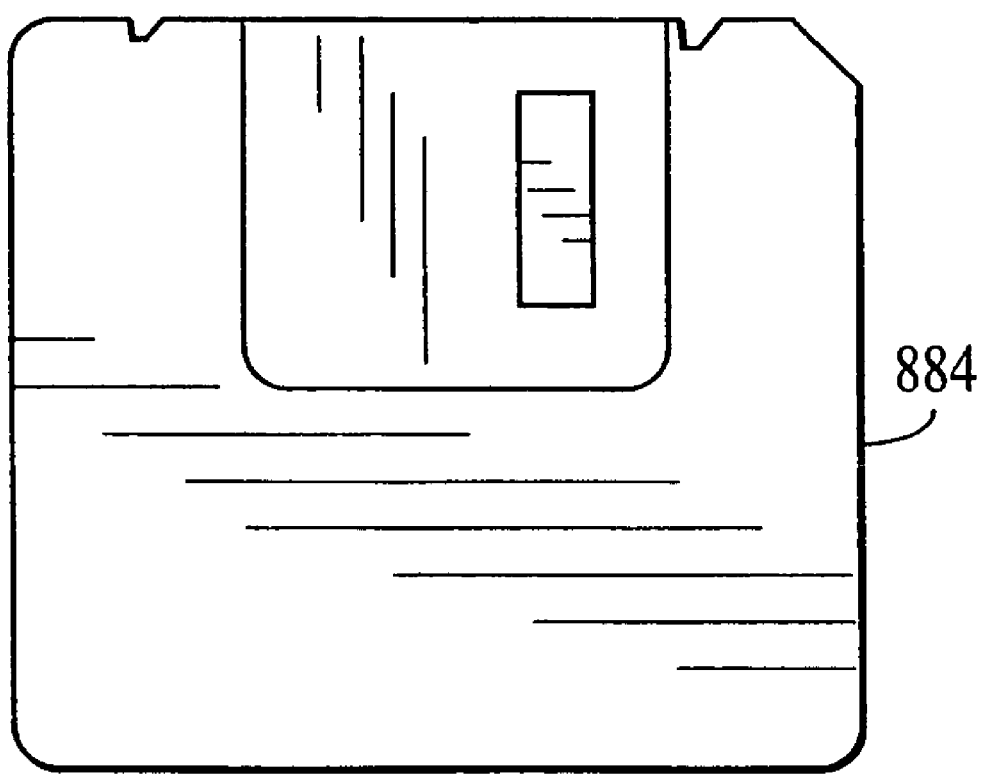
FIG. 8 is a diagram illustrating an example of a memory medium that can be used for storing computer programs of embodiments of the present invention.

FIG. 8 is an illustration of an example computer readable memory medium 884 utilizable for storing computer readable code or instructions. As one example, medium 884 may be used with disk drives illustrated in FIG. 7. Typically, memory media such as floppy disks, or a CD ROM, or a digital video disk will contain, for example, a multi-byte locale for a single byte language and the program information for controlling the modeler to enable the computer to perform the functions described herein. Alternatively, ROM 760 and/or RAM 762 illustrated in FIG. 7 can also be used to store the program information that is used to instruct the central processing unit 758 to perform the operations associated with various automated processes of the present invention. Other examples of suitable computer readable media for storing information include magnetic, electronic, or optical (including holographic) storage, some combination thereof, etc.

In general, it should be emphasized that the various components of embodiments of the present invention can be implemented in hardware, software or a combination thereof. In such embodiments, the various components and steps would be implemented in hardware and/or software to perform the functions of embodiments of the present invention. Any presently available or future developed computer software language and/or hardware components can be employed in such embodiments of the present invention. For example, at least some of the functionality mentioned above could be implemented using Visual Basic, C, C++, or any assembly language appropriate in view of the processor(s) being used. It could also be written in an interpretive environment such as Java and transported to multiple destinations to various users.

The many features and advantages of embodiments of the present invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention. For instance, output values can be transformed similar to the transform performed on the input parameters, and operations can be performed on the transformed output values similar to those performed on the transformed input parameters.

What is claimed is:

1. A computer implemented method for controlling a manufacturing apparatus, the method comprising:
   (a) identifying at least one input, the at least one input causing a change in at least two of a plurality of outputs;
   (b) storing values of the identified inputs and corresponding empirical output values along with predicted output values, wherein the predicted output values are calculated based on, in part, the values of the identified inputs;
   (c) calculating a set of transform coefficients by minimizing a score equation that is a function of, in part, differences between one or more of the empirical output values and their corresponding predicted output values, wherein the score equation is:

$$S_p = \sum_{i,k} W_{i,k} \left( y_{actual}^{ik} - y_{predicted}^{ik} \left( \vec{X}^{i'} \left( \vec{X}^i, \vec{P} \right) \right) \right)^2$$

where:
i—number of wafer;
k—number of output;
$y_{actual}$—an empirical output value;
$y_{predicted}$—a predicted output value, as calculated based on transformed inputs for a particular wafer i ($\vec{X}^{i'}$)
$\vec{X}^{i'} = (X_1^{i'}, X_2^{i'}, X_3^{i'})$ is transformed input values in a vector format; $(\vec{X}^{i'}) = (X_1^{i'}, X_2^{i'}, X_3^{i'})$ for wafer i together with the transformation parameters ($\vec{P}$), to thereby calculate an optimal value of P;
   (d) calculating one or more input values for one or more desired output values based on, in part, the calculated set of transform coefficients; and
   (e) communicating the transformed input values of (d) to a manufacturing apparatus.

2. The method of claim 1, further comprising:
collecting additional empirical data and corresponding input values;
calculating a new set of coefficients $\vec{P}_{new}$; and
using the new set of coefficients as the optimal value of $\vec{P}$.

3. The method of claim 1 further comprising:
collecting additional empirical data and corresponding input values;
calculating a new set of coefficients as $$\vec{P}_{new} = \vec{P}_{previous} + K(\vec{P}_{optimum} - \vec{P}_{previous}),$$

wherein K<1 and $\vec{P}_{previous}$ is a previously calculated optimal value of $\vec{P}$; and
using the new set of coefficients as the optimal value of $\vec{P}$.

4. A computer implemented system for controlling a manufacturing apparatus, the system comprising:
   (a) means for identifying at least one input, the at least one input causing a change in at least two of a plurality of outputs;
   (b) a memory device configured to store values of the identified inputs and corresponding empirical output values along with predicted output values, wherein the predicted output values are calculated based on, in part, the values of the identified inputs;
   (c) means for calculating a set of transform coefficients by minimizing a score equation that is a function of, in part, differences between one or more of the empirical output values and their corresponding predicted output values, wherein the score equation is:

$$S_p = \sum_{i,k} W_{i,k} \left( y_{actual}^{ik} - y_{predicted}^{ik} \left( \vec{X}^{i'} \left( \vec{X}^i, \vec{P} \right) \right) \right)^2$$

where:
i—number of wafer;
k—number of output;
$y_{actual}$—an empirical output value;
$y_{predicted}$—a predicted output value, as calculated based on transformed inputs for a particular wafer i ($\vec{X}^{i'}$)
$\vec{X}^{i'} = (X_1^{i'}, X_2^{i'}, X_3^{i'})$ is transformed input values in a vector format; $\vec{X}^i = (X_1^i, X_2^i, X_3^i)$ for wafer i together with the transformation parameters $\vec{P}$, to thereby calculate an optimal value of $\vec{P}$;
   (d) means for calculating one or more input values for one or more desired output values based on, in part, the calculated set of transform coefficients; and
   (e) means for communicating the transformed input values of (d) to a manufacturing apparatus.

5. The system of claim 4, further comprising:
means for collecting additional empirical data and corresponding input values; and
means for calculating a new set of coefficients $\vec{P}_{new}$, wherein the new set of coefficients is defined as the optimal value of $\vec{P}$.

6. The system of claim 4, further comprising:
means for collecting additional empirical data and corresponding input values; and
means for calculating a new set of coefficients as $$\vec{P}_{new} = \vec{P}_{previous} + K(\vec{P}_{optimum} - \vec{P}_{previous}),$$

wherein K<1 and $\vec{P}_{previous}$ is a previously calculated optimal value of $\vec{P}$, wherein the new set of coefficients is defined as the optimal value of $\vec{P}$.

7. A computer readable medium for storing instructions being executed by one or more computers, the instructions directing the one or more computers to perform a method for predicting output characteristics of a device produced by a manufacturing apparatus, the method comprising:
   (a) identifying at least one input, the at least one input causing a change in at least two of a plurality of outputs;
   (b) storing values of the identified inputs and corresponding empirical output values along with predicted output values, wherein the predicted output values are calculated based on, in part, the values of the identified inputs;
(c) calculating a set of transform coefficients by minimizing a score equation that is a function of, in part, differences between one or more of the empirical output values and their corresponding predicted output values, wherein the score equation is:

$$S_P = \sum_{i,k} W_{i,k} \left( y_{actual}^{ik} - y_{predicted}^{ik}\left(\vec{X}^{i'}\left(\vec{X}^{i}, \vec{P}\right)\right) \right)^2$$

where:
i—number of wafer;
k—number of output;
$y_{actual}$—an empirical output value;
$y_{predicted}$—a predicted output value, as calculated based on transformed inputs for a particular wafer i ($\vec{X}^{i'}$)
$\vec{X}^{i'}=(X_1^{i'},X_2^{i'},X_3^{i'})$ is transformed input values in a vector format; $\vec{X}^{i}=(X_1^{i},X_2^{i},X_3^{i})$ for wafer i together with the transformation parameters $\vec{P}$, to thereby calculate an optimal value of $\vec{P}$;
(d) calculating one or more input values for one or more desired output values based on, in part, the calculated set of transform coefficients; and
(e) communicating the transformed input values of (d) to a manufacturing apparatus.

8. The medium of claim 7, wherein the method further comprises:
collecting additional empirical data and corresponding input values;
calculating a new set of coefficients $\vec{P}_{new}$; and
using the new set of coefficients as the optimal value of $\vec{P}$.

9. The medium of claim 7, wherein the method further comprises:
collecting additional empirical data and corresponding input values;
calculating a new set of coefficients as $\vec{P}_{new} \equiv \vec{P}_{previous} + K(\vec{P}_{optimum} - \vec{P}_{previous})$, wherein K<1 and $\vec{P}_{previous}$ is a previously calculated optimal value of $\vec{P}$; and
using the new set of coefficients as the optimal value of $\vec{P}$.

10. A computer implemented method for controlling a manufacturing apparatus, the method comprising:
(a) identifying at least one input that causes a change in at least two of a plurality of outputs;
(b) storing values of the identified inputs and corresponding empirical output values;
(c) calculating and storing predicted output values, based on, in part, the values of the identified inputs;
(d) calculating a set of transform coefficients by minimizing a score equation that is a function of, in part, differences between one or more of the empirical output values and their corresponding predicted output values;
(e) calculating one or more input values for one or more desired output values based on, in part, the calculated set of transform coefficients; and
(f) providing the transformed input values of (e) to a manufacturing apparatus.

11. The method of claim 10, wherein the score function is:

$$S_P = \sum_{i,k} W_{i,k} \left( y_{actual}^{ik} - y_{predicted}^{ik}\left(\vec{X}^{i'}\left(\vec{X}^{i}, \vec{P}\right)\right) \right)^2$$

where:
i—number of wafer;
k—number of output;
$y_{actual}$—an empirical output value;
$y_{predicted}$—a predicted output value, as calculated based on transformed inputs for a particular wafer i ($\vec{X}^{i'}$)
$\vec{X}^{i'}=(X_1^{i'},X_2^{i'},X_3^{i'})$ is transformed input values in a vector format; $\vec{X}^{i}=(X_1^{i},X_2^{i},X_3^{i})$ for wafer i together with the transformation parameters $\vec{P}$, to thereby calculate an optimal value of $\vec{P}$.

12. The method of claim 10, further comprising:
collecting additional empirical data and corresponding input values;
calculating a new set of coefficients $\vec{P}_{new}$; and
using the new set of coefficients as the optimal value of $\vec{P}$.

13. The method of claim 10 further comprising:
collecting additional empirical data and corresponding input values; and
calculating a new set of coefficients based on the additional empirical data.

14. The method of claim 13, further comprising calculating the new set of coefficients using:

$\vec{P}_{new} \equiv \vec{P}_{previous} + K(\vec{P}_{optimum} - \vec{P}_{previous})$, wherein K<1 and $\vec{P}_{previous}$ is a previously calculated optimal value of $\vec{P}$; and
using the new set of coefficients as the optimal value of $\vec{P}$.

15. A computer implemented system for controlling a manufacturing apparatus, the system comprising:
(a) means for identifying at least one input that causes a change in at least two of a plurality of outputs;
(b) a memory device configured to store values of the identified inputs and corresponding empirical output values along with predicted output values, wherein the predicted output values are calculated based on, in part, the values of the identified inputs;
(c) means for calculating a set of transform coefficients by minimizing a score equation that is a function of, in part, differences between one or more of the empirical output values and their corresponding predicted output values;
(d) means for calculating one or more input values for one or more desired output values based on, in part, the calculated set of transform coefficients; and
(e) means for communicating the transformed input values of (d) to a manufactoring apparatus.

16. The system of claim 15, wherein the score equation is:

$$S_p = \sum_{i,k} W_{i,k} \left( y^{ik}_{actual} - y^{ik}_{predicted} \left( \vec{X}^{i'} \left( \vec{X}^i, \vec{P} \right) \right) \right)^2$$

where:
i—number of wafer;
k—number of output;
$y_{actual}$—an empirical output value;
$y_{predicted}$—a predicted output value, as calculated based on transformed inputs for a particular wafer i ($\vec{X}^{i'}$)
$\vec{X}^{i'}=(X_1^{i'},X_2^{i'},X_3^{i'})$ is transformed input values in a vector format; $\vec{X}^i=(X_1^i,X_2^i,X_3^i)$ for wafer i together with the transformation parameters $\vec{P}$, to thereby calculate an optimal value of $\vec{P}$.

17. The system of claim 15, further comprising:
means for collecting additional empirical data and corresponding input values; and
means for calculating a new set of coefficients $\vec{P}_{new}$, wherein the new set of coefficients is defined as the optimal value of $\vec{P}$.

18. The system of claim 15, further comprising:
means for collecting additional empirical data and corresponding input values; and
means for calculating a new set of coefficients based on the additional empirical data.

19. The system of claim 18, wherein the means for calculating is further configured to use the following equation in calculating the new of coefficients:

$$\vec{P}_{new} = \vec{P}_{previous} + K(\vec{P}_{optimum} - \vec{P}_{previous}),$$

wherein K<1 and $\vec{P}_{previous}$ is a previously calculated optimal value of $\vec{P}$, wherein the new set of coefficients is defined as the optimal value of $\vec{P}$.

20. A computer readable medium for storing instructions being executed by one or more computers, the instructions directing the one or more computers to perform a method for predicting output characteristics of a device produced by a manufacturing apparatus, the method comprising:
(a) identifying at least one input that causes a change in at least two of a plurality of outputs;
(b) storing values of the identified inputs and corresponding empirical output values;
(c) calculating and storing predicted output values, based on, in part, the values of the identified inputs;
(d) calculating a set of transform coefficients by minimizing a score equation that is a function of, in part, differences between one or more of the empirical output values and their corresponding predicted output values;
(e) calculating one or more input values for one or more desired output values based on, in part, the calculated set of transform coefficients; and
(f) communicating the transformed input values of (d) to a manufacturing apparatus.

21. The medium of claim 20, wherein the score function is:

$$S_p = \sum_{i,k} W_{i,k} \left( y^{ik}_{actual} - y^{ik}_{predicted} \left( \vec{X}^{i'} \left( \vec{X}^i, \vec{P} \right) \right) \right)^2$$

where:
i—number of wafer;
k—number of output;
$y_{actual}$—an empirical output value;
$y_{predicted}$—a predicted output value, as calculated based on transformed inputs for a particular wafer i ($\vec{X}^{i'}$)
$\vec{X}^{i'}=(X_1^{i'},X_2^{i'},X_3^{i'})$ is transformed input values in a vector format; $\vec{X}^i=(X_1^i,X_2^i,X_3^i)$ for wafer i together with the transformation parameters $\vec{P}$, to thereby calculate an optimal value of $\vec{P}$.

22. The medium of claim 20, wherein the method further comprises:
collecting additional empirical data and corresponding input values;
calculating a new set of coefficients $\vec{P}_{new}$; and
using the new set of coefficients as the optimal value of $\vec{P}$.

23. The medium of claim 20, wherein the method further comprises:
collecting additional empirical data and corresponding input values;
calculating a new set of coefficients as $$\vec{P}_{new} = \vec{P}_{previous} + K(\vec{P}_{optimum} - \vec{P}_{previous}),$$

wherein K<1 and $\vec{P}_{previous}$ is a previously calculated optimal value of $\vec{P}$; and
using the new set of coefficients as the optimal value of $\vec{P}$.

* * * * *